(12) United States Patent
Tamjidi et al.

(10) Patent No.: US 11,216,271 B1
(45) Date of Patent: Jan. 4, 2022

(54) INCREMENTAL UPDATE FOR OFFLINE DATA ACCESS

(71) Applicant: ServiceNow, Inc., Santa Clara, CA (US)

(72) Inventors: David Tamjidi, San Diego, CA (US); Audrey Chen, Cupertino, CA (US); Sean Andrew Bradley Bowrin, Oceanside, CA (US); George Webster, Santa Clara, CA (US); Michal Henryk Borowiec, San Diego, CA (US); Daniel Whiting, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/117,944

(22) Filed: Dec. 10, 2020

(51) Int. Cl.
G06F 9/44 (2018.01)
G06F 8/658 (2018.01)
G06F 9/54 (2006.01)
G06F 8/70 (2018.01)
G06F 11/30 (2006.01)

(52) U.S. Cl.
CPC ............... *G06F 8/658* (2018.02); *G06F 8/70* (2013.01); *G06F 9/547* (2013.01); *G06F 11/3079* (2013.01)

(58) Field of Classification Search
None
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

"Paris Mobile Configuration and Navigation," ServiceNow, Sep. 14, 2020.

(Continued)

*Primary Examiner* — Anna C Deng
(74) *Attorney, Agent, or Firm* — McDonnell Boehnen Hulbert & Berghoff LLP

(57) ABSTRACT

A system includes persistent storage containing data used by software applications, and a server application configured to perform operations, including identifying a subset of the data, where the subset is used to generate a full offline payload for a particular software application and that includes user interface (UI) components selected for the particular software application based on the subset of the data. The operations also include monitoring the subset of the data to identify a modification to particular data and, based on identifying the modification, generating a partial offline payload based on the particular data as modified, where the partial offline payload includes a subset of the UI components, and where each UI component of the subset is updated based on the particular data as modified. The operations further include receiving a request for the partial offline payload and, based on receiving the request, transmitting the partial offline payload.

20 Claims, 14 Drawing Sheets

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,590,981 B2 * | 9/2009 | Gupta ................ G06F 8/658 |
| | | | 717/168 |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,065,673 B2 * | 11/2011 | D'Souza ............... G06F 9/485 |
| | | | 717/173 |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,812,620 B2 | 8/2014 | Reisman |
| 9,015,651 B2 * | 4/2015 | Chen .................. G06F 16/958 |
| | | | 717/105 |
| 9,053,460 B2 | 6/2015 | Gilbert et al. |
| 9,098,555 B2 | 8/2015 | Bjork et al. |
| 10,079,730 B2 | 9/2018 | Subramanian et al. |
| 10,447,762 B2 * | 10/2019 | Habib .................. G06F 9/454 |
| 11,093,230 B2 * | 8/2021 | Ingle ................... H04L 67/34 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0046732 A1 * | 2/2010 | James ................ H04L 65/1069 |
| | | | 379/211.01 |
| 2010/0110932 A1 | 5/2010 | Doran et al. |
| 2012/0016706 A1 | 1/2012 | Pargaonkar et al. |
| 2017/0116498 A1 * | 4/2017 | Raveane ............. G06K 9/6257 |
| 2019/0149619 A1 | 5/2019 | Lisac et al. |
| 2019/0243641 A1 | 8/2019 | Gass et al. |
| 2020/0052976 A1 * | 2/2020 | Sherman .............. G06F 9/451 |
| 2020/0106860 A1 * | 4/2020 | Sullivan .............. G06F 9/547 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

U.S. Appl. No. 16/058,082, filed Aug. 8, 2018.
U.S. Appl. No. 16/128,370, filed Sep. 11, 2018.
U.S. Appl. No. 16/242,622, filed Jan. 8, 2019.
U.S. Appl. No. 16/402,059, filed May 2, 2019.
U.S. Appl. No. 16/538,583, filed Aug. 12, 2019.
U.S. Appl. No. 16/528,241, filed Jul. 31, 2019.
United States Patent and Trademark Office, Non-Final Office Action dated Aug. 5, 2021, issued in connection with U.S. Appl. No. 17/118,178, filed Dec. 10, 2020, 13 pages.

* cited by examiner

INCREMENTAL UPDATE FOR OFFLINE DATA ACCESS

BACKGROUND

Native mobile applications are programs specifically designed to execute on the operating system of a mobile device, such as a mobile phone, tablet, smartwatch, or any other type of wireless communication device. Such native mobile applications may be pre-packaged with the device or downloaded to the device at a later time. These applications may allow access to data of a web site or server, and may present this data in a customized fashion on a graphical user interface. This, and the ability for native mobile applications to request specific subsets of the data that is to be presented, results in these applications having numerous advantages over accessing the same data by way of a web browser.

SUMMARY

A server application may be configured to generate a full offline payload for a software application. The full offline payload may include therein a plurality of user interface (UI) components that allow the software application to perform various operations offline, that is, when the software application is not connected to a communications network and/or the server application. The full offline payload may be based on corresponding data, which may change over time while the software application is offline.

One way of synchronizing the software application with the latest changes to the corresponding data involves generating a new full offline payload, and transmitting it to the software application once the software application establishes a network connection. As the number of software applications served by the server application grows, the full offline payloads get larger in size, and/or the frequency with which the full offline payloads are regenerated increases, the workload placed on the server application may quickly increase. Keeping up with the increasing workload may involve deploying additional server applications and/or computing resources that support execution of these server applications. However, in cases where only some portions of the new full offline payload represent new and/or updated data, regeneration of the unchanged portions of the full offline payload may constitute wasted computational effort.

Accordingly, provided herein are operations related to generation of partial offline payloads that may be used to update corresponding parts of the full offline payload. Specifically, rather than regenerating the entire full offline payload when part of the underlying data is modified, the server application may generate the partial offline payload to include UI components that have been affected by the modification to the underlying data, while omitting UI components that have not been affected by this modification. Further, generation and/or retrieval of the partial offline payload may be performed automatically. That is, the partial offline payload may be retrieved when the software application establishes a network connection, and the retrieval might not depend on a user request therefor.

To that end, the server application may be configured to identify the corresponding data based on which the full offline payload is generated. For example, the server application may identify a database table accessed while generating the full offline payload, and a database command executed to obtain the correspond data. After generation of the full offline payload, the server application may monitor the corresponding data to identify a modification to particular data associated with the full offline payload. The modification may include, for example, a deletion of existing data, a change to existing data, and/or an addition of new data.

Once the partial offline payload is generated, the server application may transmit a notification to the software application and/or the software application may poll the server application to determine whether a new partial offline payload is available. The software application may obtain the partial offline payload and determine identifiers of the UI components represented therein. The software application may use these identifiers to map the UI components to corresponding parts of the full offline payload. Based on the mapping, each UI component may be used to replace a corresponding UI component of the full offline payload, thereby updating the full offline payload with the latest data.

In particular, the software application may provide a plurality of offline caches each configured to store a different type of UI component. Dividing the full offline payload into distinct types of UI components, rather than, for example, storing the full offline payload as a single data blob, may facilitate modular replacement of individual components. Thus, the mapping may indicate, for each respective UI component of the partial offline payload, a corresponding component type, which may be used to identify a corresponding cache that is to be updated based on the respective UI component.

Accordingly, a first example embodiment may involve identifying a subset of data from a plurality of data contained in persistent storage and used by a plurality of software applications. The subset of data may be used to generate a full offline payload for a particular software application from the plurality of software applications. The full offline payload may include a plurality of UI components selected for the particular software application based on the subset of data. The first example embodiment may also involve monitoring the subset of data to identify a modification to particular data associated with the full offline payload. The first example embodiment may additionally involve, based on identifying the modification to the particular data, generating a partial offline payload based on the particular data as modified. The partial offline payload may include a subset of UI components of the plurality of UI components. Each UI component of the subset of UI components may be updated based on the particular data as modified. The first example embodiment may further involve receiving, from the particular software application, a request for the partial offline payload. The first example embodiment may yet further involve, based on receiving the request for the partial offline payload, transmitting, to the particular software application, the partial offline payload.

A second example embodiment may involve a computing system that includes persistent storage containing a plurality of data used by a plurality of software applications, and a server application configured to perform operations. The operations may include identifying a subset of data from the plurality of data. The subset of data may be used to generate a full offline payload for a particular software application from the plurality of software applications. The full offline payload may include a plurality of UI components selected for the particular software application based on the subset of data. The operations may also include monitoring the subset of data to identify a modification to particular data associated with the full offline payload. The operations may additionally include, based on identifying the modification to the particular data, generating a partial offline payload based on the particular data as modified. The partial offline payload may include a subset of UI components of the plurality of UI components. Each UI component of the subset of UI components may be updated based on the particular data as modified. The operations may further include receiving, from the particular software application, a request for the partial offline payload. The operations may yet further include, based on receiving the request for the partial offline payload, transmitting, to the particular software application, the partial offline payload.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

A sixth example embodiment may involve determining that a partial offline payload that includes an update for a full offline payload is available. The full offline payload may be stored in a memory structure, may include a plurality of UI components, and may have been generated by a server application based on corresponding data. The sixth example embodiment may also involve, based on determining that the partial offline payload is available, transmitting, to the server application, a request for the partial offline payload. The sixth example embodiment may additionally involve receiving, from the server application, the partial offline payload including a subset of UI components of the plurality of UI components. Each respective UI component of the subset of UI components may have been updated based on one or more modifications of the corresponding data. The sixth example embodiment may yet additionally involve identifying, for each respective UI component of the subset of UI components, a corresponding identifier within the partial offline payload. The sixth example embodiment may further involve determining, for each respective UI component and based on the corresponding identifier, a mapping of the respective UI component to a corresponding portion of the full offline payload. The sixth example embodiment may yet further involve updating, for each respective UI component and based on the mapping, the corresponding portion of the full offline payload based on the respective UI component.

A seventh example embodiment may involve a system that includes a memory structure containing a full offline payload that includes a plurality of UI components and has been generated by a server application based on corresponding data, and a software application configured to perform operations. The operations may include determining that a partial offline payload that includes an update for the full offline payload is available. The operations may also include, based on determining that the partial offline payload is available, transmitting, to the server application, a request for the partial offline payload. The operations may additionally include receiving, from the server application, the partial offline payload that includes a subset of UI components of the plurality of UI components. Each respective UI component of the subset of UI components may have been updated based on one or more modifications of the corresponding data. The operations may yet additionally include identifying, for each respective UI component of the subset of UI components, a corresponding identifier within the partial offline payload. The operations may further include determining, for each respective UI component and based on the corresponding identifier, a mapping of the respective UI component to a corresponding portion of the full offline payload. The operations may yet further include updating, for each respective UI component and based on the mapping, the corresponding portion of the full offline payload based on the respective UI component.

In an eighth example embodiment, an article of manufacture may include a non-transitory computer-readable medium, having stored thereon program instructions that, upon execution by a computing system, cause the computing system to perform operations in accordance with the sixth and/or seventh example embodiment.

In a ninth example embodiment, a computing system may include at least one processor, as well as memory and program instructions. The program instructions may be stored in the memory, and upon execution by the at least one processor, cause the computing system to perform operations in accordance with the sixth and/or seventh example embodiment.

In a tenth example embodiment, a system may include various means for carrying out each of the operations of the sixth and/or seventh example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
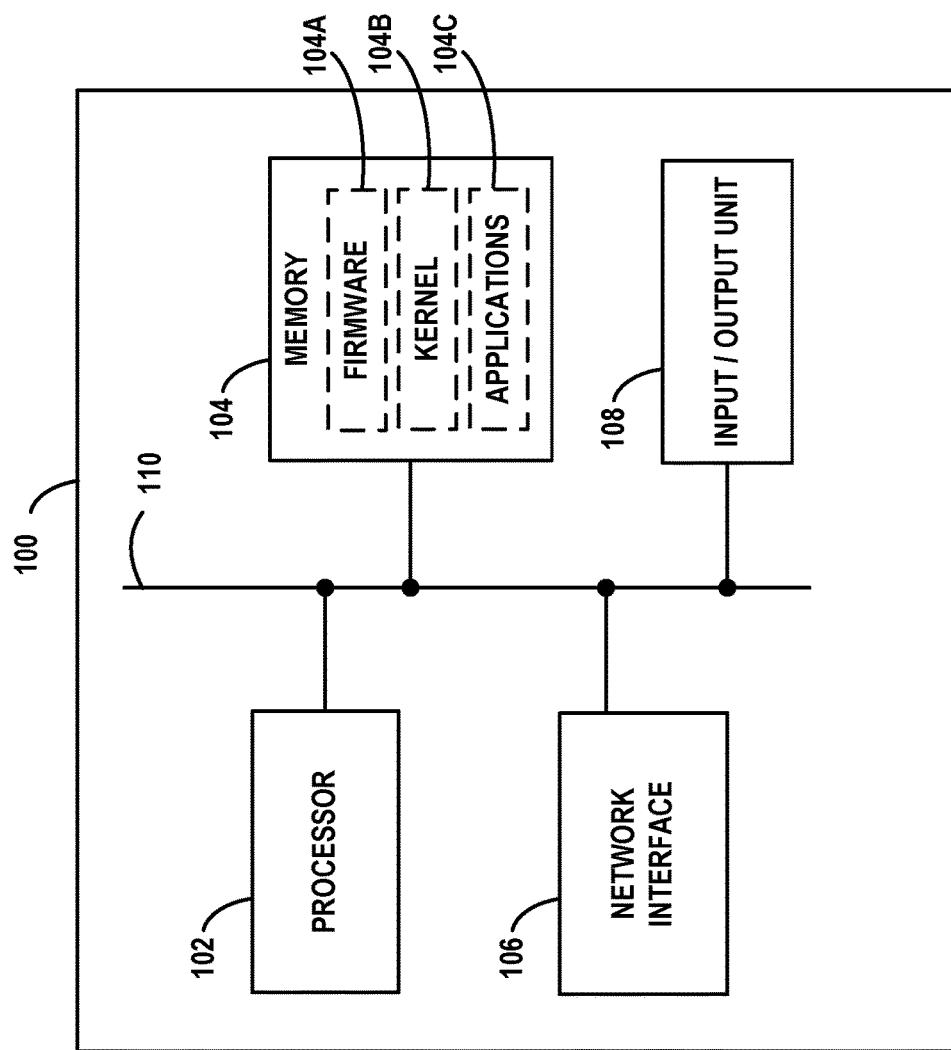
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
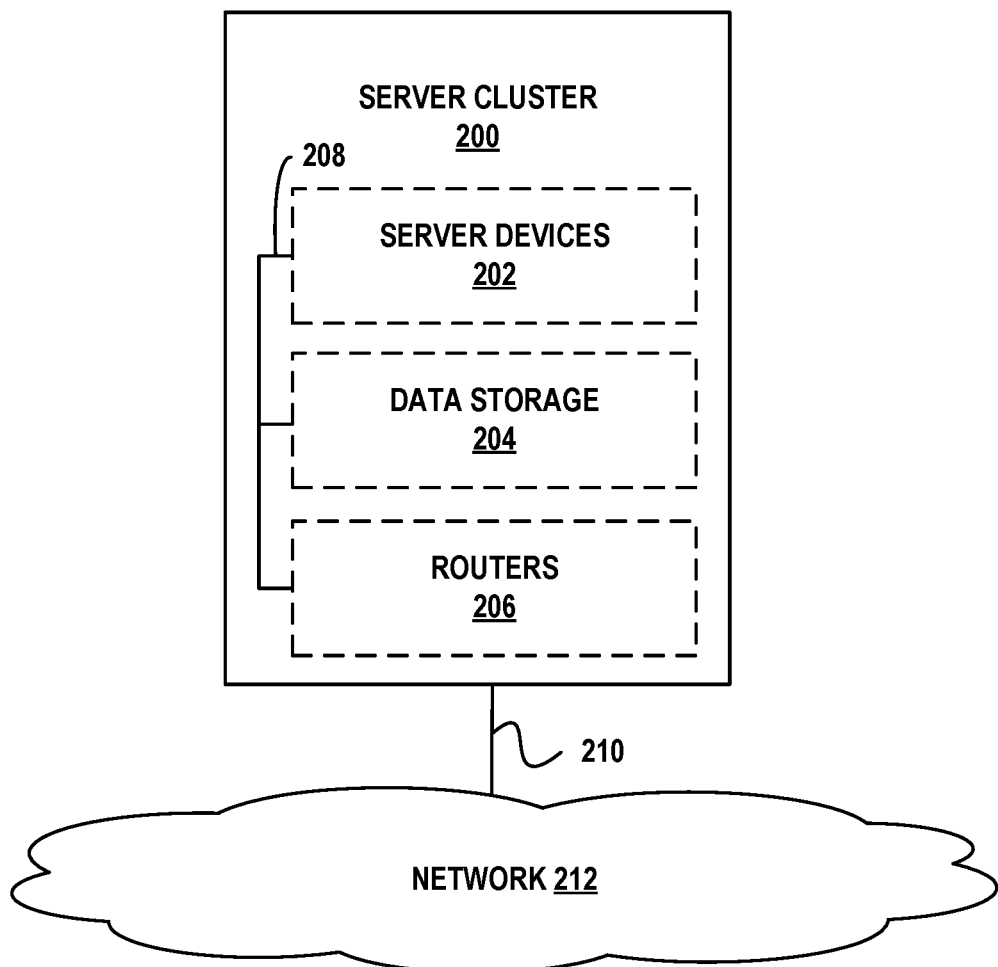
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
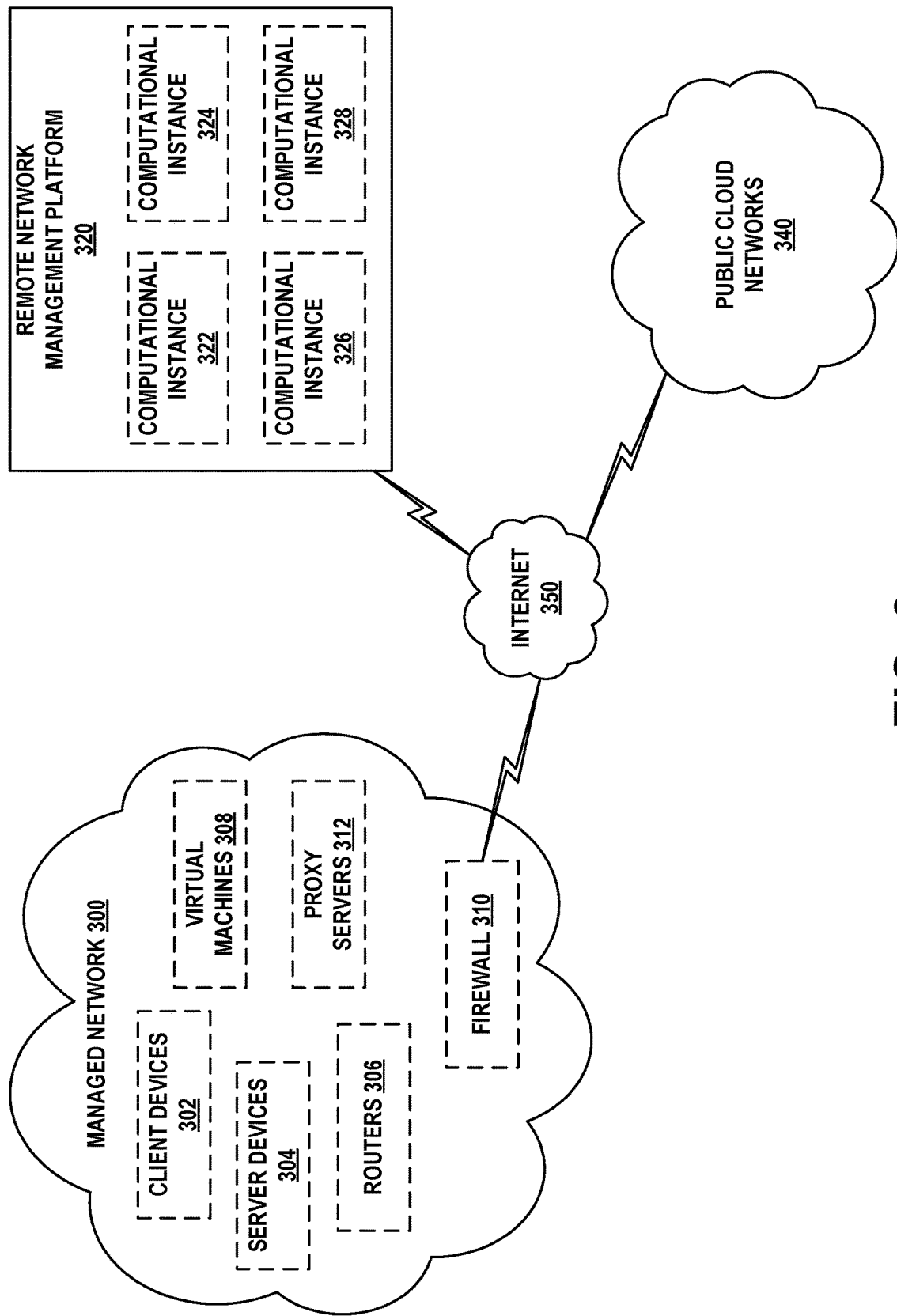
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
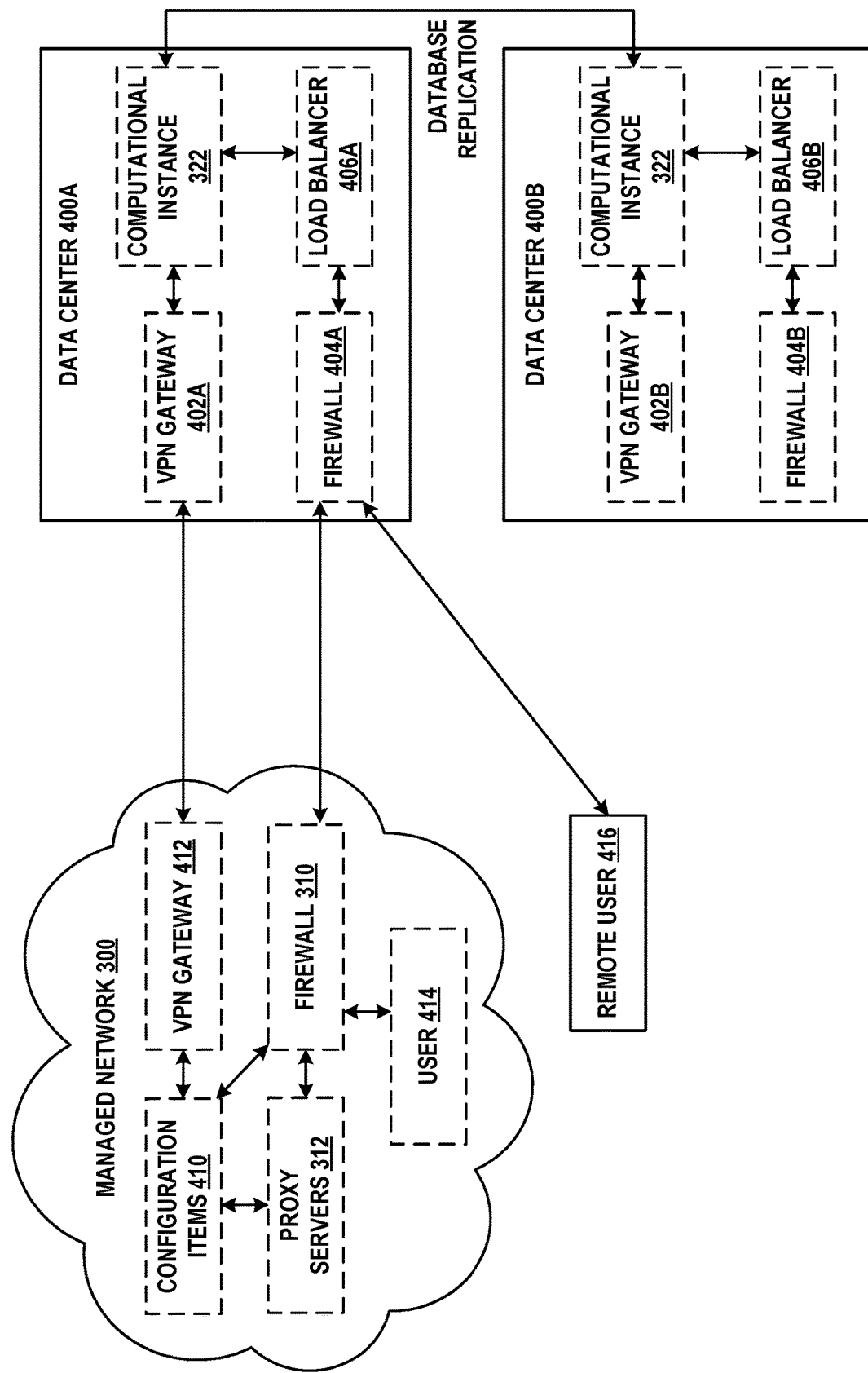
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
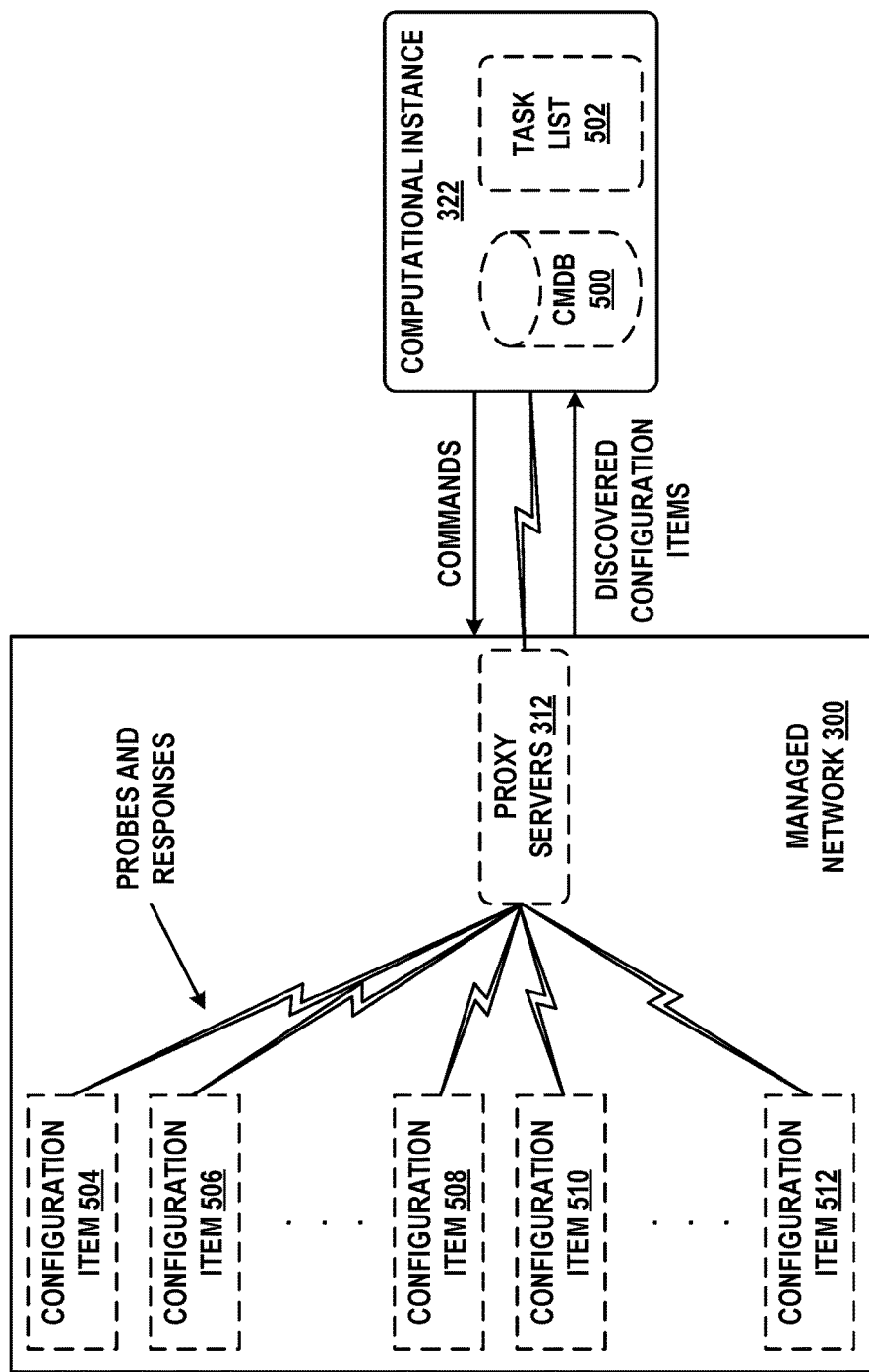
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
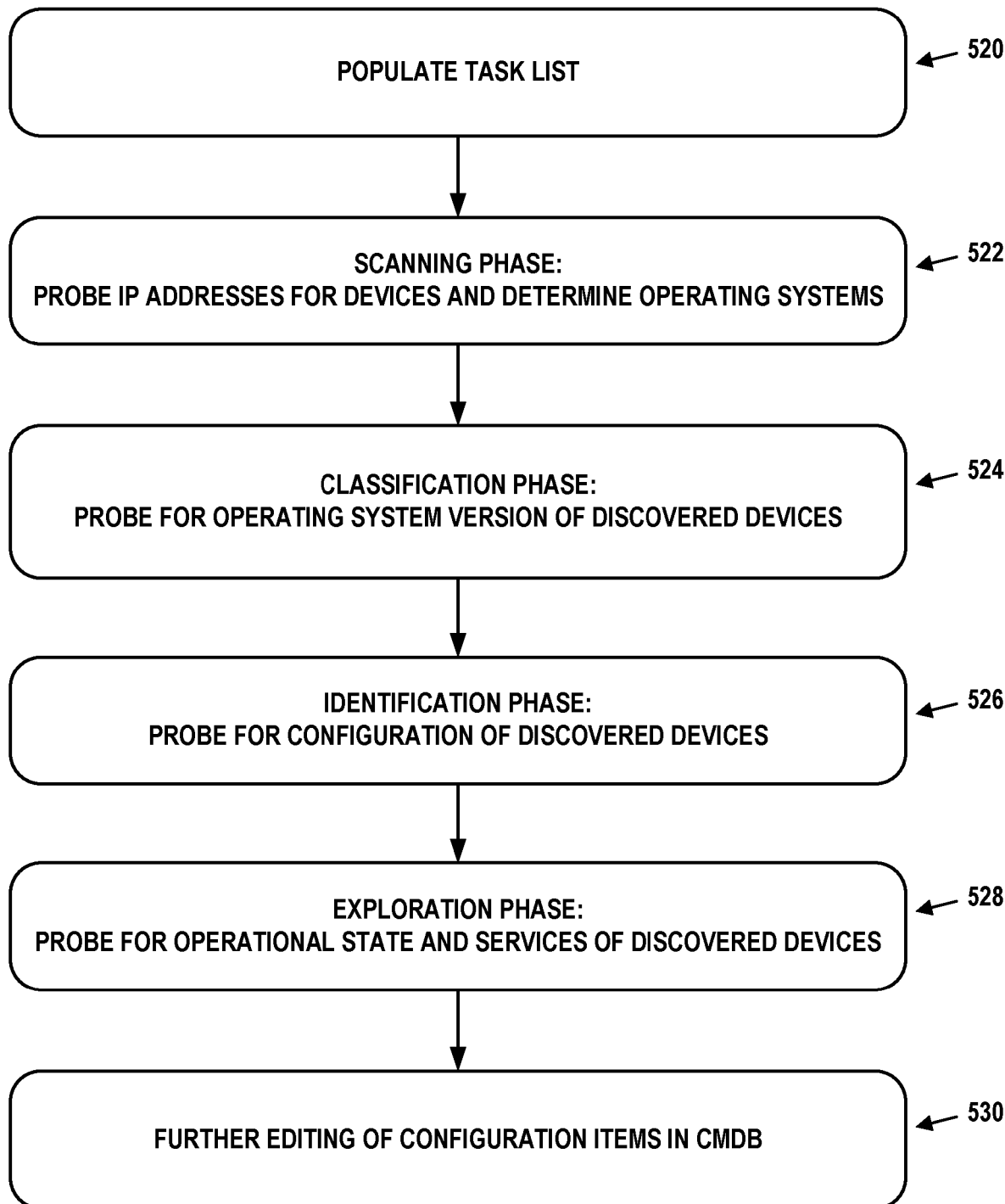
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE PARTIAL OFFLINE PAYLOAD GENERATION AND USAGE

A software application may be configured to operate offline using a full offline payload that includes therein a plurality of UI components. The plurality of UI components may provide for execution of various operations offline, that is, while the software application is not connected to a network and/or a server application and/or device. Specifically, the plurality of UI components may allow the software application, while offline, to at least partially perform at least a subset of the operations that the software application is configured to perform while online.

Over time, as the data based on which the full offline payload is generated changes, some of the UI components may become out-of-date, and it may thus be desirable to update the full offline payload to reflect the latest changes to the underlying data. However, regeneration of the full payload may be computationally-intensive, especially as the number of software applications increases, the size of the full offline payloads increases, and/or the frequency with which the full offline payloads are regenerated increases. Additionally, since regeneration of a payload may sometimes alter only a subset of the UI components thereof, computational resources may unnecessarily be expanded on regeneration of UI components that have not been affected by the modification of the underlying data.

Accordingly, rather than regenerating the entirety of the full offline payload in response to each modification of the underlying data, the server application and the software application may each be configured to update the full offline payload using partial offline payloads.

Figure 6A:
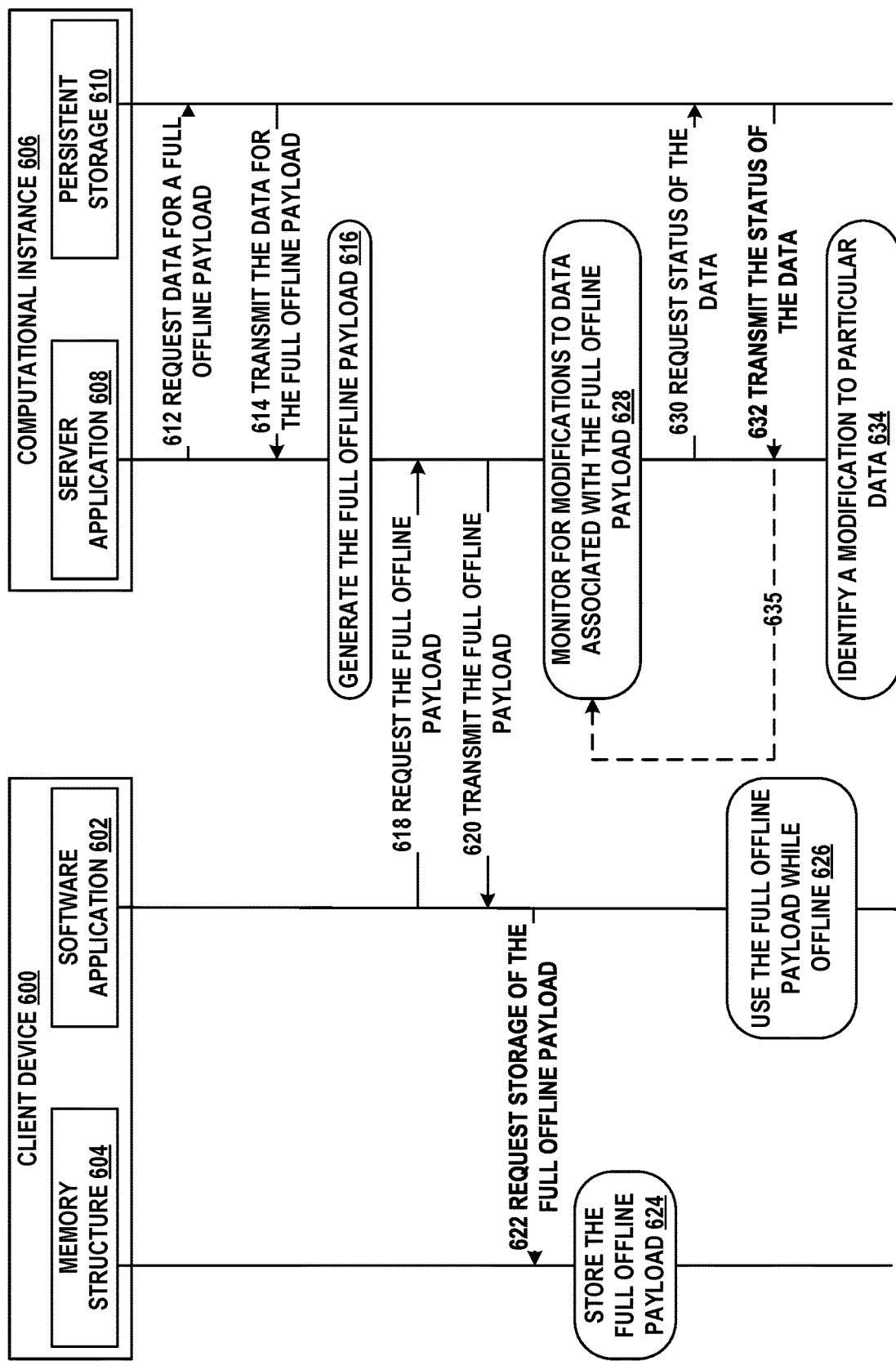
FIGS. 6A, 6B, and 6C illustrate a message flow diagram, in accordance with example embodiments.
Figure 6B:
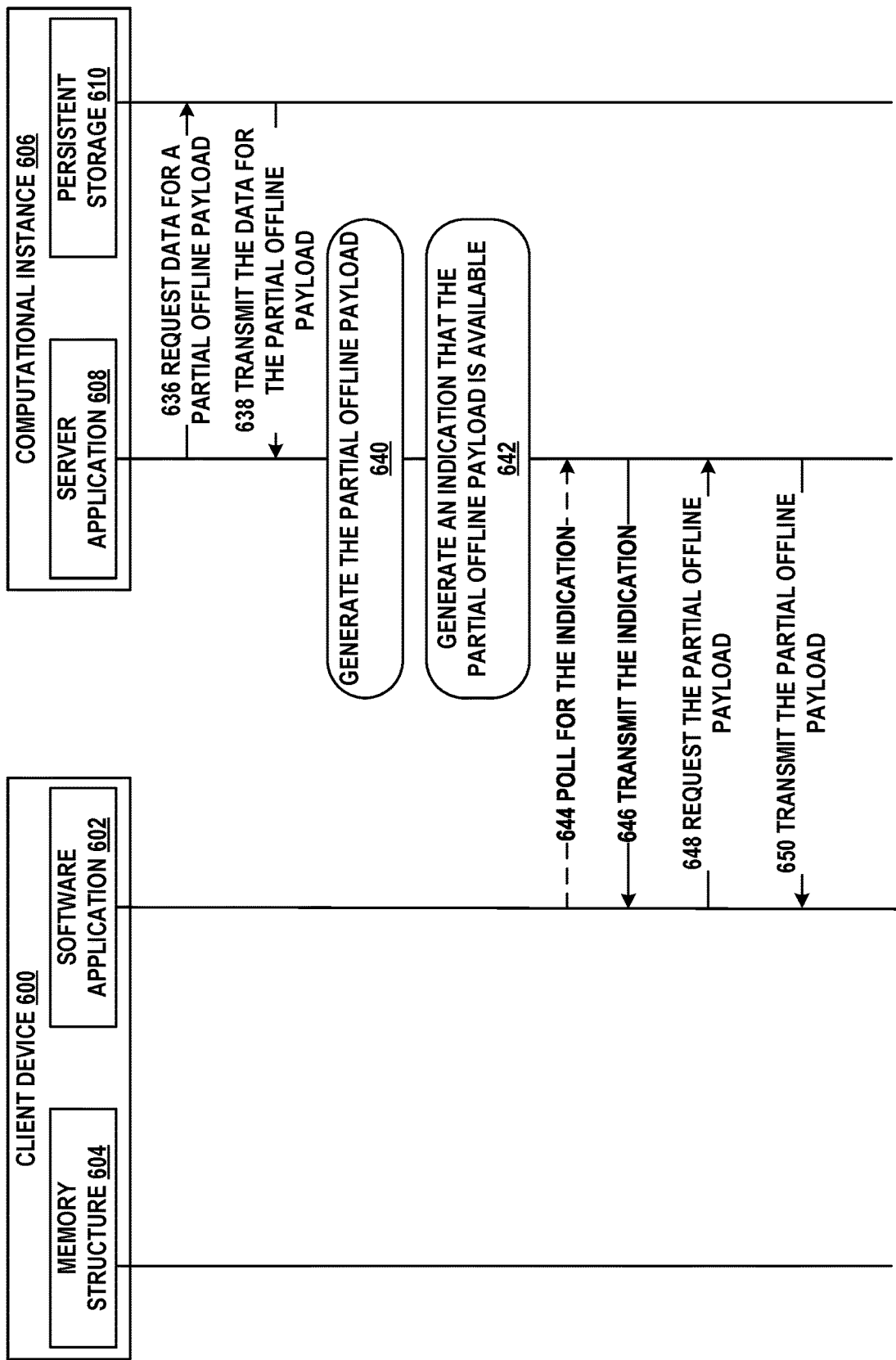
Figure 6C:
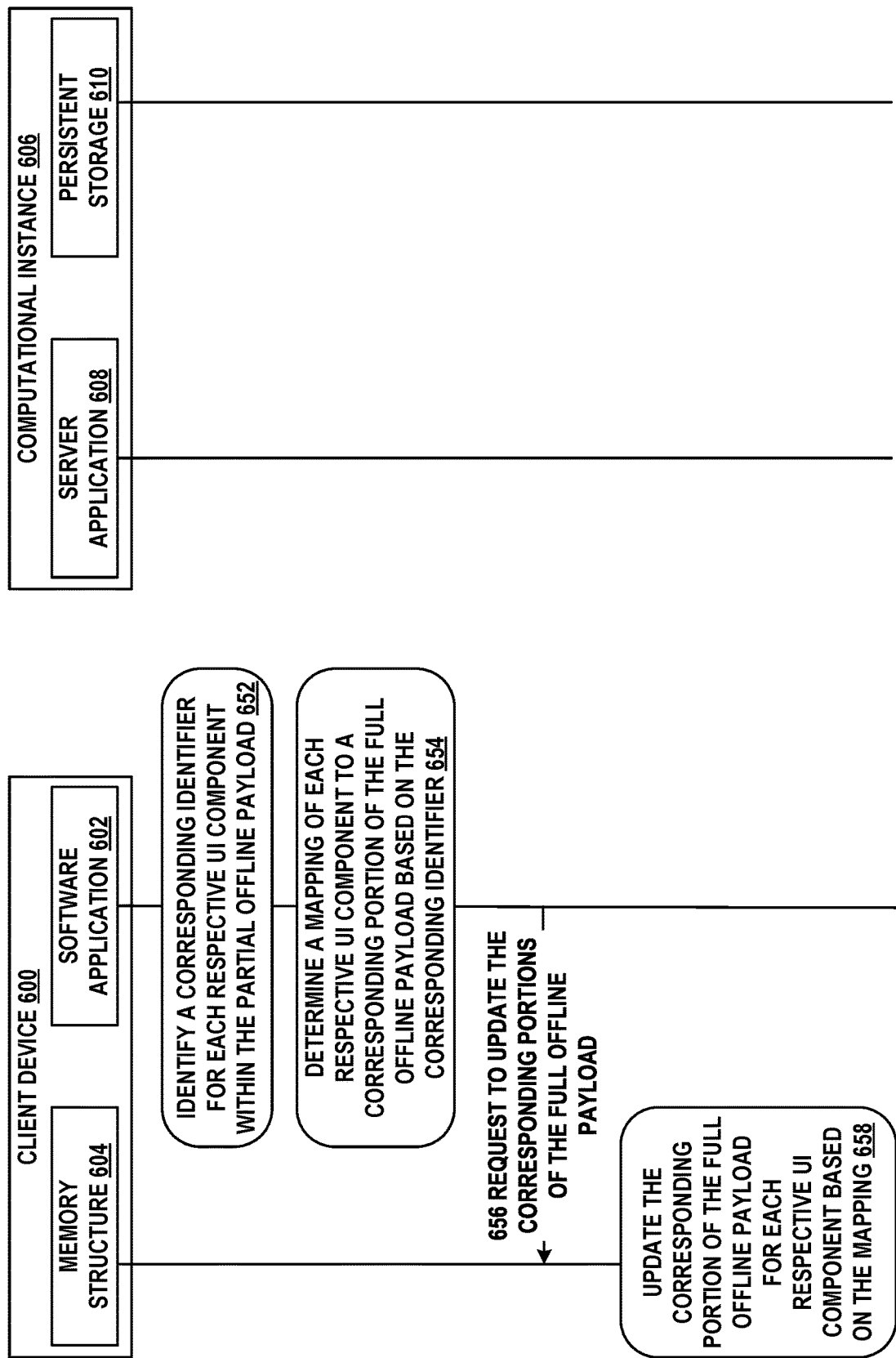

FIGS. 6A, 6B, and 6C illustrate client device 600 and computational instance 606. Client device 600 may include memory structure 604 and software application 602. Computational instance 606 may include server application 608 and persistent storage 610. Client device 600 may represent, for example, a mobile computing device, such as a mobile phone, a tablet computer, and/or a smartwatch, among other possibilities. Thus, client device 600 may sometimes be connected to a communications network (e.g., the Internet), and may at other times be disconnected from the communications network (e.g., due to being out of range of a wireless network signal). Accordingly, software application 602 may be configured to operate in an online mode and an offline mode, depending on the network connectivity of client device 600.

Memory structure 604 may include non-volatile disk storage, random access memory (RAM), and/or one or more caches. The one or more caches may include one or more physical caches, such as an on-chip cache (e.g., L1 cache) and/or an off-chip cache (e.g., an L2 or L3 cache), as well as one or more caches defined in software and configured to utilize the one or more physical caches.

Software application 602 may include any software application configured to be executed by client device 600 and operate in coordination with server application 608. For example, software application 602 may be a native mobile application specifically configured to be executed by an operating system of client device 600. Specifically, software application 602 may represent a particular instantiation and/or installation of the native mobile application. Thus, other instantiations and/or installations of the native mobile application may be viewed as being distinct from software application 602 at least in that they are executed by other client devices. In some cases, software application 602 may be configured to provide its functionality by displaying and allowing for interaction with UI components generated by server application 608.

Computational instance 606 may represent a computational instance provided by remote network management platform 320 (e.g., computational instance 322). Persistent storage 610 may be configured to store data utilized by server application 608 and/or software application 602. This data may be stored in one or more databases contained by persistent storage 610.

Server application 608 may be configured to generate UI components for software application 602 and perform various operations on behalf of software application 602. For example, one or more of the UI components generated by server application 608 may each be associated with a corresponding operation. Interaction with such UI components may cause software application 602 to transmit, to server application 608, a request for execution of the corresponding operations. Based on completion of execution of the corresponding operations, server application 608 may be configured to generate an updated version of UI components affected by the operations and transmit these UI components as updated to software application 602. Software application 602 may display the UI components as updated, thereby indicating completion of the corresponding operations.

In order to allow software application 602 to provide for display of and/or interaction with the UI components while software application 602 is offline, server application 608 may be configured to generate a full offline payload. Specifically, turning to FIG. 6A, server application 608 may be configured to transmit, to persistent storage 610, a request for data to be used for generation of a full offline payload, as indicated by arrow 612. Persistent storage 610 may contain a plurality of data used by a plurality of different software applications. Thus, the request at arrow 612 may specify a subset of data from the plurality of data, where the subset of data corresponds to the offline payload for software application 602, rather than some other software application. Server application 608 may be configured to select the subset of data based on, for example, an identifier associated with client device 600 and/or software application 602, and/or one or more templates, associated with the identifier, that define an arrangement of the UI components and/or the data to be displayed thereby. The identifier may indicate and/or be associated with, for example, one or more attributes of a user of client device 600, such as the user's role within managed network 300.

Based on and/or in response to reception of the request at arrow 612, persistent storage 610 may be configured to transmit, to server application 608, the data to be used for generation of the full offline payload, as indicated by arrow 614. Based on and/or in response to reception of the data at arrow 614, server application 608 may be configured to generate the full offline payload, as indicated by block 616. The full offline payload may include a plurality of UI components generated for software application 602.

The UI components may alternatively be referred to as graphical user interface (GUI) components. Each UI component may define a portion of a graphical user interface, and may thus be associated with a corresponding position within the graphical user interface (e.g., within a screen or view provided by software application 602), a corresponding visual appearance (e.g., color(s), font size(s), animation (s), etc.), and corresponding data to be displayed by the UI component. A given UI components may be, for example, a card, a list, a graph, a table, a text field, a button, a modal window, and/or an overlay, among other possibilities. Each UI component may correspond to, represent, and/or provide a way of interacting with one or more data and/or other resources provided by software application 602, server application 608, and/or persistent storage 610. In practice, each UI component may be defined using a data-interchange format, such as JAVASCRIPT® Object Notation (JSON), used to represent metadata defining aspects of the UI component and/or data to be provided by the UI component, a markup language, such as hypertext markup language (HTML), a style language that defines the visual appearance of the UI component, such as cascading style sheets (CSS), and/or a scripting language that defines the behavior of the UI component, such as JAVASCRIPT®, among others.

Generation of the plurality of UI components may include selection of UI components (e.g., from a library of pre-defined UI components), modification of the UI components (e.g., based on user preferences), and/or population of the selected UI components based on the data obtained at arrow 614. In some implementations, the generated plurality of UI components (e.g., the arrangement thereof, the visual appearance thereof, the data displayed thereby, etc.) may be unique to software application 602. One or more UI components may define respective screens and/or views that software application 602 is configured to provide. Thus, in some cases, one or more components of the full offline payload may be grouped and/or arranged according to the screens and/or views formed by these one or more UI components. A given UI component may, in some cases, form part of multiple screen and/or views and may thus be reused as part of multiple groups and/or arrangements of components.

In some implementations, server application 608 may be configured to perform the operations of arrow 612 and/or block 616 before a predetermined time. The predetermined time may be, for example, a time at which the user associated with client device 600 is expected to start using software application 602, such as before the user's work shift starts. In another example, server application 608 may be configured to transmit the request at arrow 612 based on and/or in response to a request received from software application 602. For example, the user of client device 600 may use software application 602 to manually request the full offline payload based on, for example, an expectation that client device 600 will soon lose network connectivity.

Software application 602 may be configured to transmit, to server application 608, a request for the full offline payload, as indicated by arrow 618. The request at arrow 618 may include the identifier associated with client device 600 and/or software application 602, which may be used by server application 608 to select and transmit the corresponding full offline payload. The ordering of these steps may be altered in various ways. For example, the operations of arrows 612 and 614 and block 616 may occur in response reception of the request at arrow 618.

In some implementations, server application 608 may be configured to transmit, to software application 602, a notification (not shown) indicating that the full offline payload has been generated and is ready for retrieval. Thus, the request at arrow 618 may be transmitted based on and/or in response to reception of this notification by software application 602. In other implementations, server application 608 may be configured to generate and store an indication that the full offline payload has been generated and is ready for retrieval, and software application 602 may be configured to poll server application 608 for this indication. Thus, the request at arrow 618 may be transmitted based on and/or in response to software application 602 retrieving the indication.

The request at arrow 618 may be transmitted to server application 608 by way of an application programming interface (API) provided by server application 608. The API may also be configured to allow software application 602 to poll server application 608 for the indication that the full offline payload has been generated and is ready for retrieval. The API may allow software application 602 to communicate with server application 608 by way of uniform resource locator-based queries. For example, the API may be a representational state transfer (REST) API.

Based on and/or in response to reception of the request at arrow 618, server application 608 may be configured to transmit, to software application 602, the full offline payload, as indicated by arrow 620. The full offline payload may be represented as a data structure defined using, for example, JSON, among other possibilities. The full offline payload may be associated with a corresponding payload identifier that distinguishes the full offline payload generated for software application 602 from other full offline payloads generated for other software applications. Based on and/or in response to reception of the full offline payload at arrow 620, software application 602 may be configured to provide, to memory structure 604, a request for storage of the full offline payload, as indicated by arrow 622. Based on and/or in response to reception of the request at arrow 622, memory structure 604 may be configured to store the full offline payload, as indicated by block 624.

Memory structure 604 may provide a plurality of different caches, each associated with a corresponding UI component type. The caches of memory structure 604 are illustrated in and discussed in more detail with respect to FIG. 8. Thus, storage of the full offline payload may include dividing the plurality of UI components in the full offline payload according to component type, and storing each of the components of a given type in the corresponding cache. Additionally, each UI component may be associated with a corresponding identifier, which may be stored in association with the UI component.

Software application 602 may be configured to use the full offline payload to provide its functionality while client device 600 is offline, as indicated by block 626. Specifically, while client device 600 is online, software application 602 may be configured to provide its functionality by obtaining UI components from server application 608 based on user inputs. That is, while software application 602 is communicatively connected to server application 608, the UI components may be obtained on an as-needed basis based on user inputs. On the contrary, when client device 600 is offline, software application 602 might not be communicatively connected to server application 608, and may thus rely on the full offline payload, stored in an offline cache, to provide its functionality.

Accordingly, the full offline payload may include at least a subset of the UI components that software application 602 would be able to obtain if it were online. While offline, software application 602 may be configured to display one or more of the UI components of the full offline payload and/or provide for interaction therewith. Interaction with some UI components of the full offline payload may cause software application 602 to initiate performance of corresponding operations. In some cases, software application 602 may be configured to perform an operation corresponding to a particular UI component locally and while remaining offline. In other cases, an operation corresponding to a particular UI component may cause software application 602 to request, from server application 608, performance of this operation upon establishing a network connection thereto. After interaction with the particular UI component and while software application 602 remains offline, a visual appearance of the particular UI component may be modified (e.g., the particular UI component may be grayed-out) to indicate that the request to perform the corresponding operation is acknowledged, and the operation will be performed by server application 608 upon establishing a network connection.

Server application 608 may be configured to monitor for modifications to data associated with the full offline payload, as indicated by block 628. In some cases, monitoring of the data may be performed based on and/or in response to generation of the full offline payload at block 616 and/or transmission thereof to software application 602 at arrow 620. Specifically, server application 608 may be configured to monitor for (i) changes to the data that was used to generate the full offline payload at block 616 and/or (ii) addition of new data that was not used to generate the full offline payload at block 616 but would have been used if it were available at an earlier time. That is, server application 608 may be configured to monitor persistent storage 610 for any modifications in persistent storage 610 that would change the content of the full offline payload, including modifications to existing data and/or additions of new data.

In one example, monitoring of the data may include transmitting, to persistent storage 610, a request for status of the data associated with the full offline payload, as indicated by arrow 630. Based on and/or in response to reception of the request at arrow 630, persistent storage 610 may be configured to transmit, to server application 608, the status of the data associated with the full offline payload, as indicated by arrow 632. Based on the transmission at arrow 632, server application 608 may be configured to determine whether any modifications have been made to the data associated with the full offline payload.

If no modifications have been identified by server application 608, the operations of block 628 and arrows 630 and 632 may be repeated, as indicated by arrow 635. Specifically, the operations of block 628 and arrows 630 and 632 may be repeated until a modification to particular data associated with the full offline payload is identified, as indicated by block 634. The modification may include (i) a change to the data that was used to generate the full offline payload at block 616 and/or (ii) addition of new data that will be used to generate new versions of the full offline payload. The modification may be caused by software application 602 and/or one or more other software applications. In some implementations, the data may be monitored for modifications in other ways. For example, persistent storage 610 may be configured to monitor the data and transmit, to server application 608, a notification when the particular data has been modified.

Turning to FIG. 6B, based on and/or in response to identifying the modification to the particular data at block 634, server application 608 may be configured to transmit, to persistent storage 610, a request for data for a partial offline payload, as indicated by arrow 636. The data for the partial offline payload may include (i) the particular data that has been modified and (ii) other data affected by the modification to the particular data. Server application 608 may be configured to identify the other data affected by the modification to the particular data based on one or more dependencies among the plurality of UI components of the full offline payload. The one or more dependencies may be implicitly and/or explicitly defined, for example, by the one or more templates that define the arrangement of the UI components and/or the data to be displayed thereby.

Based on and/or in response to reception of the request at arrow 636, persistent storage 610 may be configured to transmit, to server application 608, the data for the partial offline payload, as indicated by arrow 638. Based on and/or in response to reception of the data for the partial offline payload at arrow 638, server application 608 may be configured to generate the partial offline payload, as indicated by block 640. The partial offline payload may include a subset of UI components of the plurality of UI components that form part of the full offline payload. Each UI component of the subset may be updated (relative to its state in the full offline payload) based on the particular data as modified. UI components that have not been affected by the modification to the particular data may be omitted from the partial offline payload. Notably, rather than only providing the modified data in the partial offline payload, the partial offline payload may include the UI components as regenerated by server application 608 based on the modified data. Thus, software application 602 may use the UI components of the partial offline payload directly, without needing to independently generate its own UI components based on the partial offline payload.

In some implementations, the partial offline payload may include a plurality of UI components. For example, the partial offline payloads may include all UI components affected by the modifications to the particular data. In other implementations, each partial offline payload may include one UI component and/or one group of related UI components. For example, each partial offline payload may include a group of UI components that form a particular screen and/or view of software application 602. Thus, the modification to the particular data may result in generation of multiple partial offline payloads, each containing a subset of the UI components affected by the modifications to the particular data.

In one example, the data may be monitored at block 628 and modifications thereto may trigger generation of partial offline payloads at block 640 after the full offline payload has been retrieved by software application 602. In another example, the data may be monitored at block 628 and modifications thereto may trigger generation of partial offline payloads at block 640 after the full offline payload has been generated, and this monitoring and generation may continue if software application 602 retrieves the full offline payload within a predetermined period of time (e.g., within one hour of its generation). If software application 602 does not retrieve the full offline payload within the predetermined period of time, the monitoring of the data and/or generation of partial offline payloads may cease.

A size of the partial offline payload might be no more than a threshold fraction of a size of the full offline payload. For example, the threshold fraction may be ⅟₁₀₀, ⅟₂₀, ⅟₁₀, or ½, among other possibilities. Thus, generation of the partial offline payload at block 640 may take proportionally less time than generation of the full offline payload at block 616. Accordingly, updating the full offline payload using partial offline payloads, rather than by regenerating the entirety of the full offline payload, may allow server application 608 to conserve computational resources. Additionally, updating the full offline payload using partial offline payloads may allow server application 608 to utilize computational resources more efficiently. For example, server application 608 may be configured to distribute generation of multiple different partial offline payloads associated with a full offline payload among multiple different computing devices, thus allowing these partial offline payloads to be generated in parallel. The extent of computational savings and/or the extent of computational efficiency may increase as the size of the full offline payload increases, the frequency of modifications to the underlying data increases, and/or number of software applications increases.

Based on and/or in response to generation of the partial offline payload at block 640, server application 608 may be configured to generate an indication that the partial offline payload is available, as indicated by block 642. In some implementations, software application 602 may be configured to poll server application 608 for the indication generated at block 642, as indicated by arrow 644. Server application 608 may thus be configured to transmit, to software application 602, the indication, as indicated by arrow 646, based on and/or in response to reception of a polling request from software application 602. In other implementations, server application 608 may be configured to transmit, to software application 602, a notification containing the indication generated at block 642. Server application 608 may thus be configured to transmit, to software application 602, the indication, as indicated by arrow 646, based on and/or in response to generation of the indication at block 642 and without dependence on reception of the polling request from software application 602 (i.e., arrow 644 may be omitted).

Based on and/or in response to reception of the indication at arrow 646, software application 602 may be configured to transmit, to server application 608, a request for the partial offline payload, as indicated by arrow 648. Based on and/or in response to reception of the request at arrow 648, server application 608 may be configured to transmit, to software application 602, the partial offline payload, as indicated by arrow 650. The request at arrow 648 may include (i) a payload identifier associated with the full offline payload and (ii) a particular time at which software application 602 last retrieved an offline payload (e.g., full or partial), each of which may be used by server application 608 to select an appropriate partial offline payload to transmit to software application 602. In some embodiments, the ordering of these steps may be altered. For example, the operations of arrows 636 and 638 and block 640 may occur in response to the operations of arrow 648.

Specifically, since server application 608 may be configured to serve a plurality of different software applications, the payload identifier associated with the full offline payload may allow server application 608 to select the appropriate partial offline payload for software application 602 from a plurality of different partial payloads generated for the plurality of different software applications. The particular time at which software application 602 last retrieved an offline payload may allow server application 608 to select an appropriate partial offline payload from a plurality of partial offline payloads generated for software application 602 at different times. Specifically, server application 608 may be configured to transmit, to software application 602, partial offline payloads that were generated after the particular time, and omit transmitting partial payloads generated before the particular time (since these would have already been provided to software application 602).

Turning to FIG. 6C, based on and/or in response to reception of the partial payload at arrow 650, software application 602 may be configured to identify a corresponding identifier for each respective UI component provided within the partial offline payload, as indicated by block 652. For example, each respective UI component may be associated with an alphanumeric identifier that is used by both the full offline payload and the partial offline payload to identify different versions of the respective UI component. The corresponding identifier of a particular UI component in the partial offline payload may thus indicate what portion of the full offline payload is to be updated using the particular UI component.

Based on and/or in response to identifying the corresponding identifiers at block 652, software application 602 may be configured to determine a mapping of each respective UI component to a corresponding portion of the full offline payload, as indicated by block 654. That is, software application 602 may determine the portions of the full offline payload that are to be updated using the partial offline payload. Specifically, the identifier of each respective UI component in the partial offline payload may be used to select a corresponding part of the full offline payload to be updated by the respective UI component.

Based on and/or in response to determination of the mapping at block 654, software application 602 may be configured to provide, to memory structure 604, a request to update the corresponding portions of the full offline payload in accordance with the mapping. Based on and/or in response to reception of the request at arrow 656, memory structure 604 may be configured to update the corresponding portion of the full offline payload for each respective UI component based on the mapping, as indicated by block 658. Specifically, each UI component in the partial payload may be used to replace a corresponding component in the full offline payload. Thus, portions of the full offline payload that are stale/not up-to-date in view of the modification identified at block 634 may be updated to reflect this modification.

VI. EXAMPLE SERVER APPLICATION COMPONENTS AND OPERATIONS

Figure 7A:
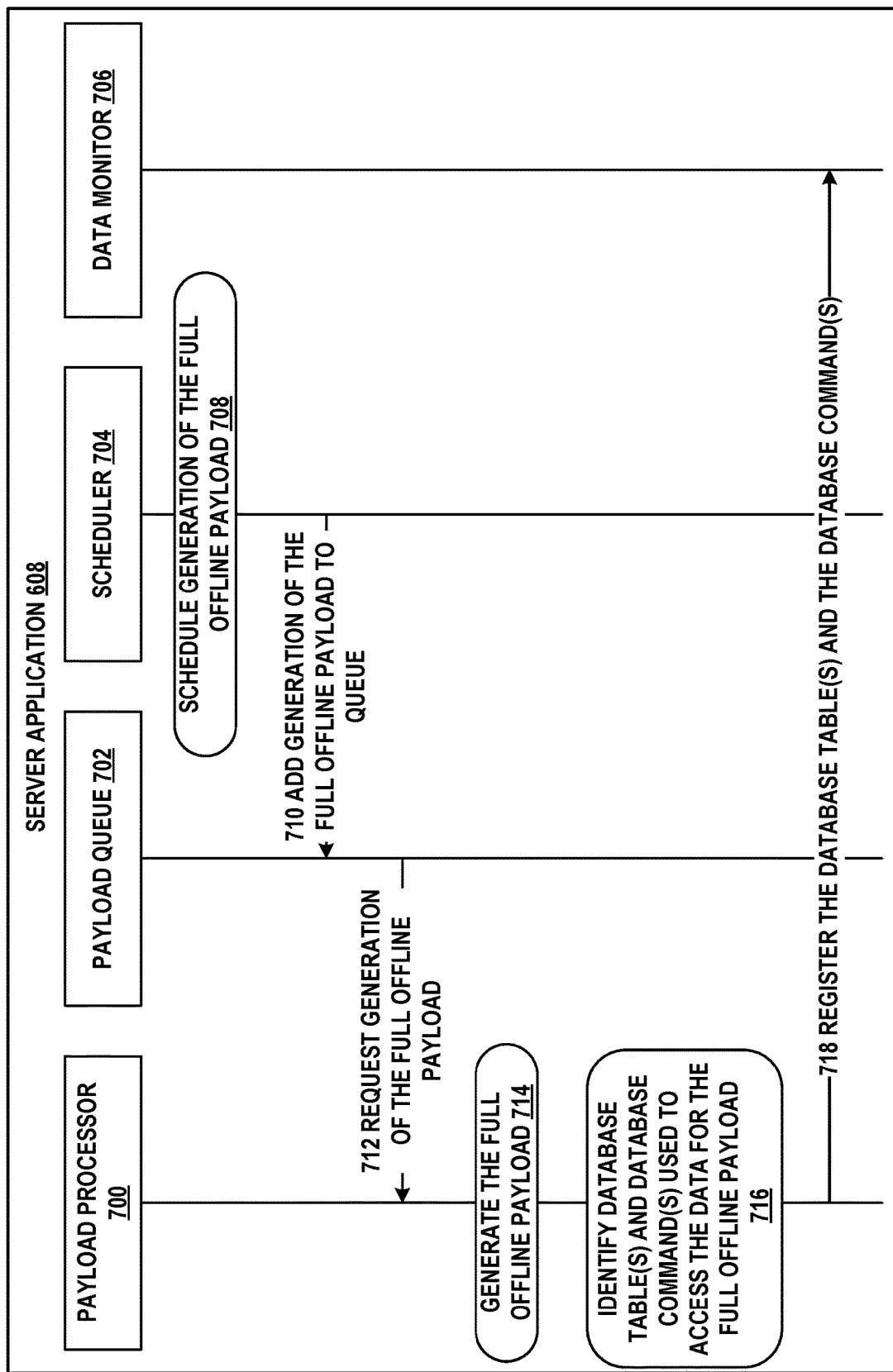
FIGS. 7A and 7B illustrate a message flow diagram, in accordance with example embodiments.
Figure 7B:
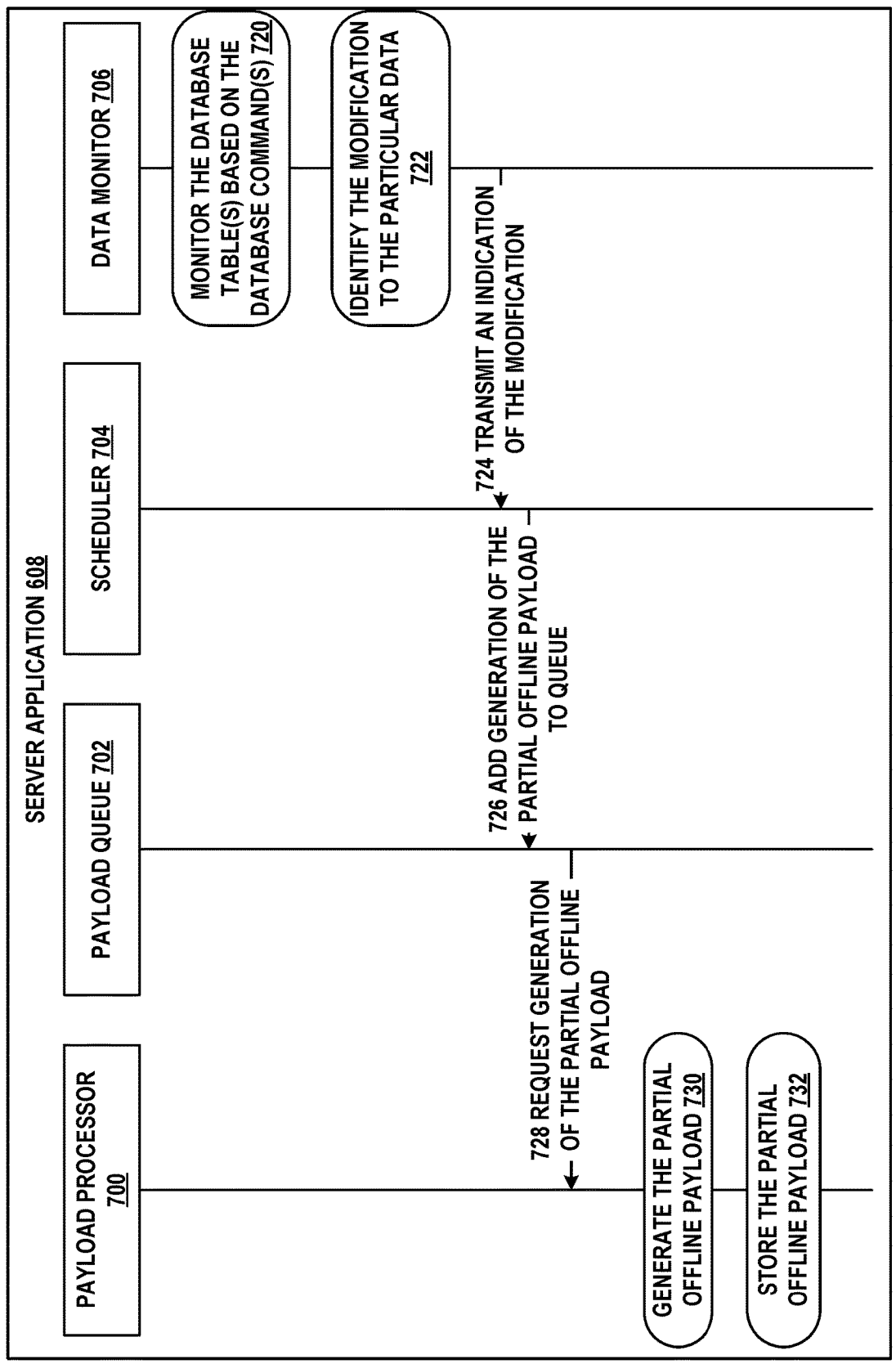

FIGS. 7A and 7B illustrate example components of server application 608, and operations of these components in connection with generation of the full and partial offline payloads. Specifically, server application 608 may include payload processor 700, payload queue 702, scheduler 704, and data monitor 706. In some implementations, rather than forming part of server application 608, one or more of these components may be a stand-alone component provided by computational instance 606. For example, data monitor 706 may be provided by computational instance 606 and made available for use by a plurality of different software applications executed by computational instance 606.

Scheduler 704 may be configured to schedule the workload of payload processor 700 by adding various offline payload generation tasks to payload queue 702. Specifically, scheduler 704 may be configured to schedule the generation of full and/or partial offline payloads for a plurality of software applications associated with computational instance 606. Accordingly, scheduler 704 may be configured to schedule generation of the full offline payload corresponding to the full offline payload generated at block 616 of FIG. 6A, as indicated by block 708.

Based on and/or in response to scheduling generation of the full offline payload at block 708, scheduler 704 may be configured to add a particular task representing generation of the full offline payload to payload queue 702, as indicated by arrow 710. Payload queue 702 may be, for example, a first-in-first-out (FIFO) queue, and the particular task representing generation of the full offline payload may thus be added to a rear of the queue, while payload processor 700 may operate by removing tasks from a front of the queue. In some implementations, payload queue 702 may include separate queues for full offline payloads and partial offline payloads.

Accordingly, based on the first task reaching a predetermined position in payload queue 702 (e.g., the front of payload queue 702 in the FIFO case), payload queue 702 may be configured to provide, to payload processor 700, a request for generation of the full offline payload, as indicated by arrow 712. Alternatively and/or additionally, payload processor 700 may be configured to provide, to payload queue 702, a request for the task found at the predetermined position within the queue, and the request at arrow 712 may be responsive to this request by payload processor 700.

Based on and/or in response to reception of the request at arrow 712, payload processor 700 may be configured to generate the full offline payload, as indicated by block 714. Payload processor 700 may represent one or more software processes, threads, and/or other computational resources configured to generate full and/or partial offline payloads. Generation of the full offline payload may involve payload processor 700 communicating with persistent storage 610 to obtain the data for the full offline payload (e.g., as shown by arrows 612 and 614 of FIG. 6A).

Based on and/or in response to generation of the full offline payload at block 714, payload processor 700 may be configured to identify one or more database tables and one or more database commands used to access the data for the full offline payload, as indicated by block 716. Payload processor 700 may be configured to identify the database tables and database commands based on the instructions executed by payload processor 700 to obtain the data for the full offline payload from persistent storage 610. For example, the instructions executed by payload processor 700 to obtain the data for the full offline payload may be based on one or more templates that define the UI components of the full offline payload. The one or more database tables and the one or more database commands may define the subset of data stored in persistent storage 610 that corresponds to the full offline payload. For example, the one or more database commands may include one or more database queries configured to retrieve the data from the one or more database tables. A change in the results returned by executing the one or more database queries may indicate that the full offline payload is to be updated by way of a partial offline payload.

Accordingly, based on and/or in response to identifying the one or more database tables and the one or more database commands at block 716, payload processor 700 may be configured to provide, to data monitor 706, a request to register the one or more database tables and the one or more database commands with data monitor 706, as indicated by arrow 718. Each combination of the one or more database tables and one or more database commands may be associated with a corresponding UI component, thus allowing a modification to particular data to be mapped back to the UI component that utilizes the particular data. In some implementations, registration of database tables and database commands associated with a plurality of different software applications may be batched.

Turning to FIG. 7B, data monitor 706 may be configured to monitor the one or more database tables based on the one or more database commands, as indicated by block 720. Specifically, data monitor 706 may be configured to monitor the contents of persistent storage 610 to identify one or more modifications to the data in the one or more database tables associated with execution of the one or more database commands. In one example, data monitor 706 may poll persistent storage 610 to identify the one or more modifications (e.g., based on a time stamp indicating a time of a most recent update to the particular data). In another example, data monitor 706 may mediate transactions between persistent storage 610 and various software applications, and may thus identify the one or more modifications while these modifications are requested by one or more of the various software applications.

Thus, based on and/or in response to monitoring the one or more database tables at block 720, data monitor 706 may be configured to identify a modification to the particular data, as indicated by block 722 (corresponding to block 634 of FIG. 6A). Thus, data monitor 706 may be configured to identify a modification to the data on which the full offline payload is based. For example, identifying the modification may involve determining that a result of execution of the one or more database commands with respect to the one or more databases has changed. The result may change due to modification of existing data and/or addition of new data.

Based on and/or in response to identification of the modification at block 722, data monitor 706 may be configured to provide, to scheduler 704, an indication of the modification, as indicated by arrow 724. For example, the indication of the modification may include an indication of a particular database table and a particular database command for which the resulting data has changed. In cases where a given data is used by multiple different full offline payloads of multiple different software applications, data monitor 706 may be configured to generate one indication of the modification for each of the multiple different full offline payloads. For example, multiple requests to monitor the given data may be combined into a single data watcher task, and the output of this task may be used to generate a corresponding indication of the modification for each of the multiple different full offline payloads.

Based on and/or in response to reception of the transmission at arrow 724, scheduler 704 may be configured to add, to payload queue 702, a task representing generation of the partial offline payload associated with the modification of the particular data, as indicated by arrow 726. Alternatively, in some implementations, the operations of arrows 724 and 726 may be combined. For example, data monitor 706 may be configured to add, to payload queue 702, the task representing generation of the partial offline payload without using scheduler 704.

Based on and/or in response to the task representing generation of the partial offline payload reaching a predetermined position within payload queue 702, payload queue 702 may be configured to provide to payload processor 700 a request for generation of the partial offline payload, as indicated by arrow 728. Based on and/or in response to reception of the request at arrow 728, payload processor 700 may be configured to generate the partial offline payload, as indicated by block 730. Based on and/or in response to generation of the partial offline payload at block 730, payload processor 700 may be configured to store the partial offline payload (e.g., in persistent storage 610) for retrieval by software application 602, as indicated by block 732.

The partial offline payload generated at block 730 may be time stamped, and this time stamp may be used to coalesce multiple payload generation requests into a single partial offline payload. For example, in some implementations, data monitor 706, scheduler 704, and payload queue 702 may be configured to perform the operations of block 722 through arrow 728 for each data modification detected by data monitor 706. However, in some cases, multiple modifications may be made to the same or related data during a relatively short period of time. Since there may be some delay between identifying a given modification at block 722 and generation of a corresponding partial offline payload at block 730, in some cases, the partial offline payload generated based on a first modification in a series of modifications to the same or related data may already represent part of and/or the entirety of the series of modifications.

Accordingly, payload processor 700 may be configured to, prior to generating a given partial offline payload based on the particular data as modified, check a time stamp associated with a previously-generated partial offline payload based on the particular data. If the previously-generated partial offline payload was generated after the modification to the particular data was detected, payload processor 700 may determine that the previously-generated partial offline payload already represents the modification to the particular data, and a further partial offline payload might not be generated. On the other hand, if the previously-generated partial offline payload was generated before the modification to the particular data was detected, payload processor 700 may determine that the previously-generated partial offline payload does not represent the modification to the particular data, and a further partial offline payload may be generated.

The time stamp associated with the partial offline payload may also be used by server application 608 to select a particular partial offline payload to provide to software application 602. Specifically, server application 608 may be configured to provide, to software application 602, partial offline payloads associated with time stamps that exceed a time stamp of a partial offline payload that has been most recently retrieved by software application 602. In cases where multiple partial offline payloads have been generated for the same screen and/or view of software application 602, server application 608 may use the time stamps associated therewith to select a most recent partial offline payload to provide to software application 602. Server application 608 might not transmit, to software application 602, partial offline payloads that have been superseded by the most recent partial offline payload for the same screen and/or view.

Payload processor 700 may additionally or alternatively be configured to delete offline payloads that have expired and/or delete instructions to generate offline payloads that have expired. Specifically, payload processor 700 and/or scheduler 704 may be configured to determine that a given partial offline payload is expired based on expiration of the corresponding full offline payload and/or generation of an additional partial offline payload that supersedes the given partial offline payload. For example, the full offline payload may expire after a predetermined amount of time (e.g., 24 hours) following its generation. The additional partial offline payload may supersede the given partial offline payload by containing at least the same data (including any modifications thereto) as the given partial offline payload. The additional partial offline payload may be generated before or after the given partial offline payload.

In order to identify expired partial offline payloads, scheduler 704 may be configured to monitor the partial offline payloads generated by payload processor 700 and/or the instructions to generate partial offline payloads stored in payload queue 702. Based on and/or in response to identifying an expired partial offline payload, scheduler 704 may be configured to remove, from payload queue 702, instructions to generate the expired partial offline payload (if the expired partial offline payload has not yet been generated) or add to payload queue 702 a task configured to cause payload processor 700 to delete the expired partial offline payload (if the expired partial offline payload has already been generated).

VII. EXAMPLE SOFTWARE APPLICATION AND MEMORY STRUCTURE COMPONENTS AND OPERATIONS

Figure 8:
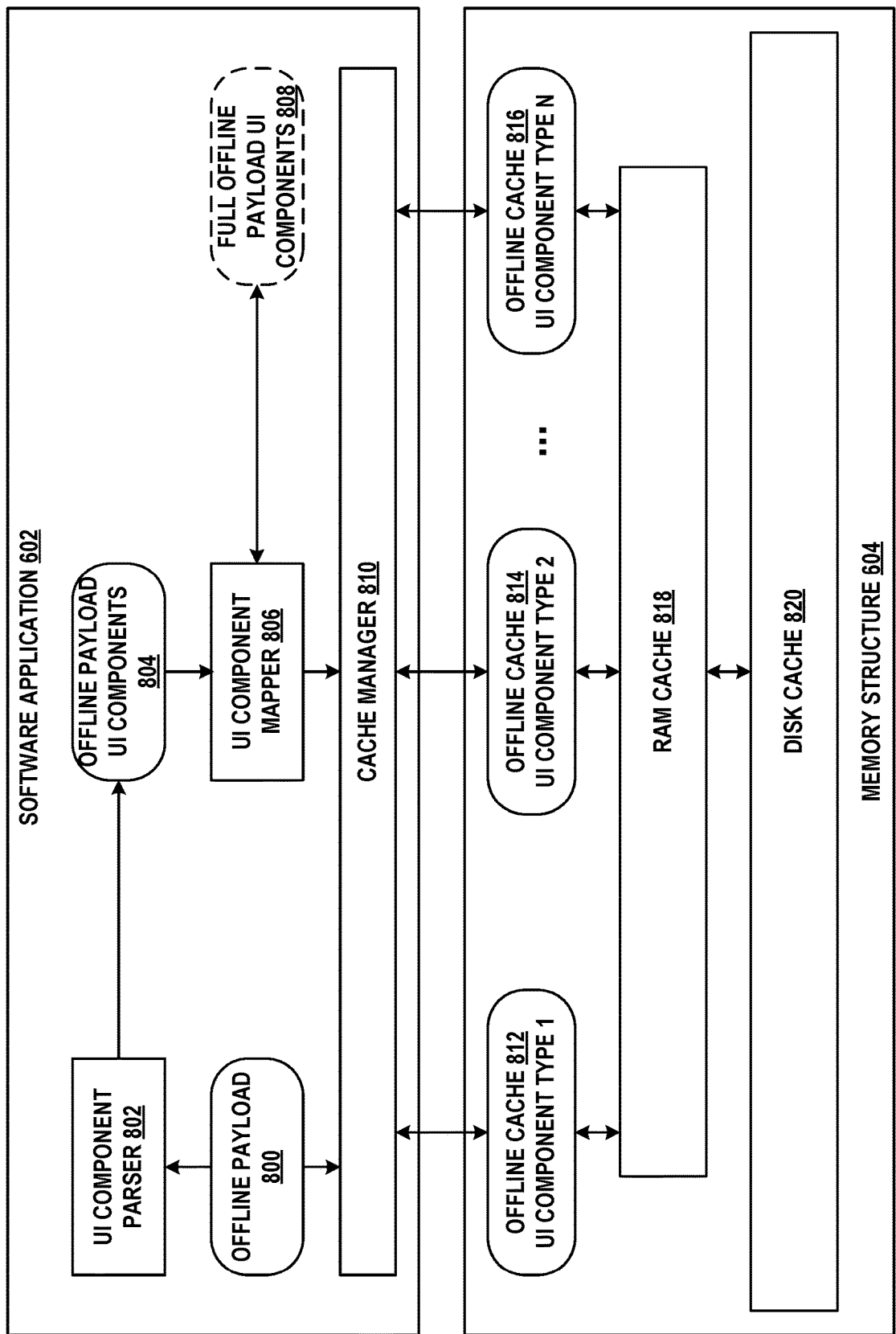
FIG. 8 illustrates components of a software application and a memory structure, in accordance with example embodiments.

FIG. 8 illustrates example components of software application 602 and memory structure 604. Specifically, software application 602 may include UI component parser 802, UI component mapper 806, and cache manager 810. Memory structure 604 may include disk cache 820, random access memory (RAM) cache 818, and one or more other caches (not shown), such as an on-chip cache (e.g., L1 cache) and/or an off-chip cache (e.g., an L2 or L3 cache). Memory structure 604 may also include offline cache 812 and offline cache 814 through offline cache 816 (i.e., offline caches 812-816).

RAM cache 818, disk cache 820, and the one or more other caches may represent memory components and/or memory management components provided by client device 600 and/or an operating system thereof. Offline caches 812-816 may represent regions of the one or more other caches, RAM cache 818, and/or disk cache 820 reserved by cache manager 810 for storage of the full and/or partial offline payloads. Thus, cache manager 810 may interact with an operating system of client device 600 to allocate memory and/or disk space in order to define offline caches 812-816.

Offline cache 812 may correspond to and be configured to store UI components of a first type (i.e., type 1), offline cache 814 may correspond to and be configured to store UI components of a second type (i.e., type 2), and offline cache 816 may correspond to and be configured to store UI components of an nth type (i.e., type N). Component types 1 through N may represent component types that could be found within a full offline payload. In one example, the component types may include documents, feeds, and/or scripts, among other possibilities. Accordingly, offline caches 812-816 and the component types corresponding thereto may define a division of the full offline payload into distinct subsets, each of which may be stored in a corresponding portion of memory structure 604.

When a particular full offline payload, represented by offline payload 800, is obtained by software application 602, UI component parser 802 may be used to identify offline payload UI components 804 present within the particular full offline payload. For example, UI component parser may search a data structure representing offline payload 800 for predefined fields representing attributes of the UI components. Offline payload UI components 804 may represent each respective UI component using a corresponding identifier, which may be unique in the context of the particular full offline payload.

Offline payload UI components 804 may be provided to UI component mapper 806, which may be configured to generate and/or store a representation of full offline payload UI components 808. Full offline payload UI components 808 may represent the identifier and component type of every UI component present within the particular full offline payload. For example, UI component mapper 806 may be configured to identify each UI component of the particular full offline payload using the same identifier as was provided in offline payload 800.

UI component mapper 806 may be configured to cause cache manager 810 to store each of the UI components of the particular full offline payload using a corresponding offline cache of offline caches 812-816. For example, UI component mapper 806 may indicate, for each respective UI component in the particular full offline payload, a corresponding type of the respective component and the identifier of the respective component. Based on the corresponding type of the respective UI component, cache manager 810 may be configured to select, from offline caches 812-816, a corresponding cache in which to store the respective UI component. Cache manager 810 may use the identifier associated with the respective UI component to uniquely identify the respective component within the selected cache.

Once the particular full offline payload is stored in memory structure 604, software application 602 and memory structure 604 may be configured to receive partial offline payloads that update the particular full offline payload. Specifically, a particular partial offline payload may be represented by offline payloads 800. Thus, the particular partial offline payload may be parsed by UI component parser 802 to identify UI components, represented by offline payload UI components 804, present within the particular partial offline payload.

UI component mapper 806 may be configured to generate a mapping between the UI components identified within the particular partial offline payload and full offline payload UI components 808. That is, UI component mapper 806 may be configured to map portions of the particular partial offline payload to corresponding portions of the particular full offline payload. Specifically, UI component mapper 806 may be configured to select, for each respective UI component of offline payload UI components 804 represented within the particular partial offline payload, a corresponding UI component within the particular full offline payload based on the identifier associated with the respective UI component. In cases where a particular UI component is new (i.e., a corresponding UI component is not already part of the particular full offline payload), UI component mapper 806 may be configured to update full offline payload UI components 808 by generating a new representation for the particular UI component.

Based on the mapping generated by UI component mapper 806, cache manager 810 may be configured to update, for each respective UI component represented by the particular partial offline payload, a corresponding portion of memory structure 604. Specifically, for each respective UI component, cache manager 810 may select, from offline caches 812-816, a corresponding offline cache that contains the corresponding UI component of the particular full offline payload. Cache manager 810 may also select the corresponding UI component of the particular full offline payload using the identifier associated with the respective UI component of the particular partial offline payload. Cache manager 810 may further replace the corresponding UI component of the particular full offline payload with the respective UI component, thus updating the corresponding portion of the particular full offline payload.

In some implementations, memory structure 604 may also include a plurality of online caches corresponding to offline caches 812-816. The plurality of online caches may store one or more UI components used by software application 602 while software application 602 is connected to a communications network. Thus, online functionality and offline functionality of software application 602 may be provided using mutually exclusive portions of memory structure 604.

In some implementations, software application 602 may be configured to poll server application 608 for a partial offline payload based on and/or in response to a modification to one or more UI components stored in the online payloads. Specifically, server application 608 may be configured to generate the partial offline payload based on and/or in response to receiving, from software application 602, a request for performance of one or more operations. That is, server application 608 may perform the one or more operations, generate and transmit to software application 602 an online payload based on performance of the one or more operations, and generate a partial offline payload representing one or more modifications resulting from performance of the one or more operations. When software application 602 receives both the online payload and the partial offline payload, the online caches and offline caches 812-816 may be synchronized. Thus, if software application 602 were to lose network connectivity, the latest operations requested thereby, and executed by server application 608, may be reflected in the updated full offline payload stored in the offline caches 812-816.

VIII. EXAMPLE OPERATIONS

Figure 9:
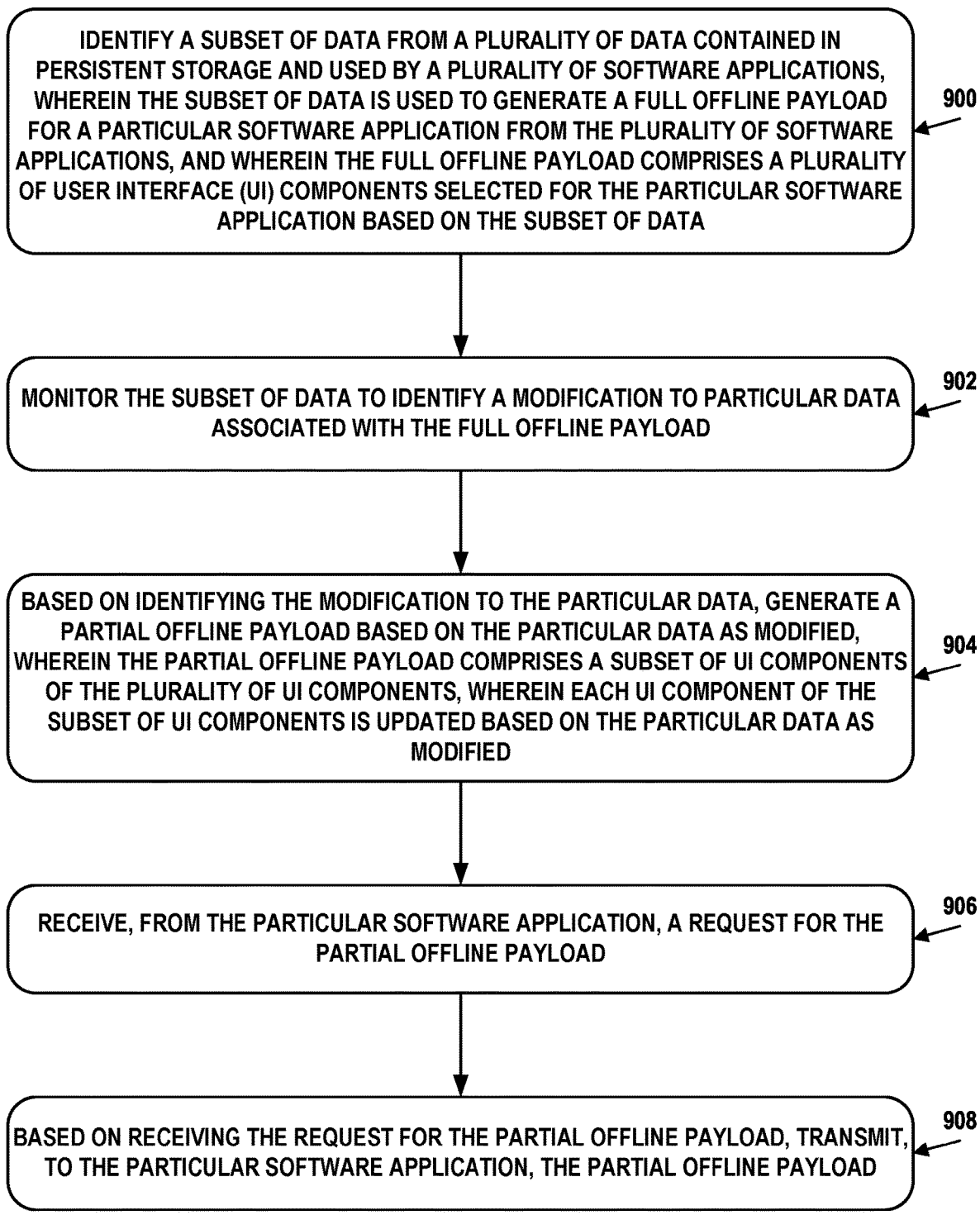
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform (e.g., computational instance 606) and/or a server application executed thereby (e.g., server application 608).

The embodiments of FIG. 9 may be simplified by the removal of any one or more of the features shown therein. Further, these embodiments may be combined with features, aspects, and/or implementations of any of the previous figures or otherwise described herein.

Block 900 may involve identifying a subset of data from a plurality of data contained in persistent storage and used by a plurality of software applications. The subset of data may be used to generate a full offline payload for a particular software application from the plurality of software applications. The full offline payload may include a plurality of UI components selected for the particular software application based on the subset of data.

Block 902 may involve monitoring the subset of data to identify a modification to particular data associated with the full offline payload.

Block 904 may involve, based on identifying the modification to the particular data, generating a partial offline payload based on the particular data as modified. The partial offline payload may include a subset of UI components of the plurality of UI components. Each UI component of the subset of UI components may be updated based on the particular data as modified.

Block 906 may involve receiving, from the particular software application, a request for the partial offline payload.

Block 908 may involve, based on receiving the request for the partial offline payload, transmitting, to the particular software application, the partial offline payload.

In some embodiments, the plurality of data may be stored in a database. Identifying the subset of data may include identifying (i) one or more database tables from the database that were accessed while generating the full offline payload and (ii) one or more database commands executed to access the subset of data in the one or more database tables. Monitoring the subset of data may include, after generation of the full offline payload, monitoring the one or more database tables for a modification to one or more data associated with the one or more database commands.

In some embodiments, based on generating the partial offline payload, a notification may be transmitted to the particular software application. The notification may indicate that the partial offline payload is available. Reception of the notification may be configured to cause the particular software application to transmit, to the server application, the request for the partial offline payload.

In some embodiments, based on generating the partial offline payload, an indication that the partial offline payload is available may be stored. The particular software application may be configured to poll the server application for the indication. Reception of the indication may be configured to cause the particular software application to transmit, to the server application, the request for the partial offline payload.

In some embodiments, the subset of data may be monitored to identify a further modification made to the particular data at a first time. A second time at which the partial offline payload was generated may be determined. It may be determined that the first time precedes the second time. Based on determining that the first time precedes the second time, (i) it may be determined that the partial offline payload includes the further modification made to the particular data and (ii) generation of a further partial offline payload based on the further modification made to the particular data may be omitted.

In some embodiments, the full offline payload for the particular software application may be generated before a predetermined time and based on one or more attributes associated with the particular software application. The subset of data may be identified based on data accessed while generating the full offline payload.

In some embodiments, the particular software application may be configured to provide for execution of respective operations by displaying a corresponding UI component of the plurality of UI components. A request for execution of the respective operations associated with one or more UI components of the plurality of UI components may be received from the particular software application. The particular software application may be configured to transmit the request based on interaction with the one or more UI components. The one or more UI components may be updated based on performance of the respective operations associated therewith. A further partial offline payload comprising the one or more UI components as updated may be generated. The further partial offline payload may be transmitted to the particular software application.

In some embodiments, generating the partial offline payload may include, based on identifying the modification to the particular data, determining that the particular software application and at least one other software application each utilize the particular data, and generating a respective partial offline payload based on the particular data as modified for each of the particular software application and the at least one other software application.

In some embodiments, the request for the partial offline payload may be received from the particular software application by way of an application programming interface (API) provided by the server application and based on the particular software application establishing a network connection to the computing system.

In some embodiments, (i) the partial offline payload and (ii) a first time associated with generation of the partial offline payload may each be stored. The request for the partial offline payload may include an indication of a second time associated with retrieval of a prior offline payload. The partial offline payload may be transmitted to the particular software application further based on the second time preceding the first time.

In some embodiments, the subset of data may be monitored to identify a further modification to further data of the subset of data. Based on identifying the further modification to the further data, one or more of: (i) an instruction to generate a further partial offline payload based on the further data as modified or (ii) the further partial offline payload, may be generated. It may be determined that the further partial offline payload is expired based on one or more of: (i) expiration of the full offline payload or (ii) generation of an additional partial offline payload that supersedes the further partial offline payload. Based on determining that the further partial offline payload is expired, one or more of: (i) the instruction to generate the further partial offline payload or (ii) the further partial offline payload, may be deleted.

In some embodiments, generating the partial offline payload may include determining that the particular software application has retrieved the full offline payload and, in response to determining that the particular software application has retrieved the full offline payload, generating the partial offline payload.

In some embodiments, each respective software application of the plurality of software applications may include a corresponding instantiation of a mobile software application. Each corresponding instantiation may be configured to be executed by a corresponding mobile computing device associated with a corresponding user.

In some embodiments, a size of the partial offline payload might not be more than a threshold fraction of the full offline payload.

Figure 10:
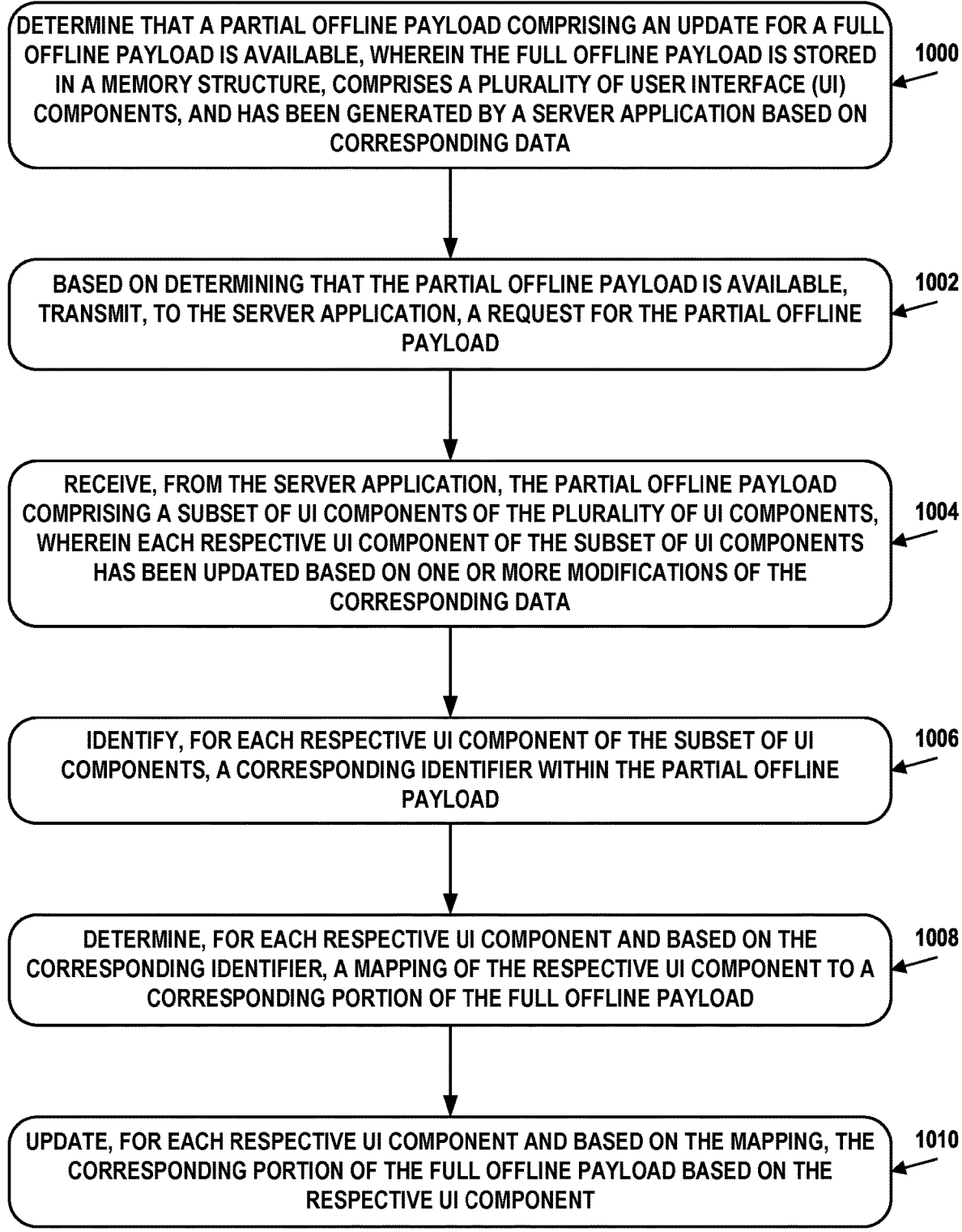
FIG. 10 is a flow chart, in accordance with example embodiments.

FIG. 10 is a flow chart illustrating an example embodiment. The process illustrated by FIG. 10 may be carried out by a computing device, such as computing device 100. However, the process can be carried out by other types of devices or device subsystems. For example, the process could be carried out by a portable computer, such as a laptop, a tablet device, and/or a mobile telephone (e.g., client device 600) and/or a software application executed thereby (e.g., software application 602).

The embodiments of FIG. 10 may be simplified by the removal of any one or more of the features shown therein. Further, these embodiments may be combined with features, aspects, and/or implementations of any of the previous figures or otherwise described herein.

Block 1000 may involve determining that a partial offline payload that includes an update for a full offline payload is available. The full offline payload may be stored in a memory structure, may include a plurality of UI components, and may have been generated by a server application based on corresponding data.

Block 1002 may involve, based on determining that the partial offline payload is available, transmitting, to the server application, a request for the partial offline payload.

Block 1004 may involve receiving, from the server application, the partial offline payload that includes a subset of UI components of the plurality of UI components. Each respective UI component of the subset of UI components may have been updated based on one or more modifications of the corresponding data.

Block 1006 may involve identifying, for each respective UI component of the subset of UI components, a corresponding identifier within the partial offline payload.

Block 1008 may involve determining, for each respective UI component and based on the corresponding identifier, a mapping of the respective UI component to a corresponding portion of the full offline payload.

Block 1010 may involve updating, for each respective UI component and based on the mapping, the corresponding portion of the full offline payload based on the respective UI component.

In some embodiments, determining that the partial offline payload is available may include establishing a network connection and, based on establishing the network connection, polling the server application by transmitting thereto an inquiry regarding availability of the partial offline payload.

In some embodiments, determining that the partial offline payload is available may include establishing a network connection and, based on establishing the network connection, receiving, from the server application, a notification indicating that the partial offline payload is available.

In some embodiments, determining the mapping of the respective UI component may include determining that a prior version of a particular UI component of the subset of UI components is represented by a particular portion of the full offline payload. Updating the corresponding portion of the full offline payload may include, based on determining that the prior version of the particular UI component is represented by the particular portion of the full offline payload, replacing the particular portion of the full offline payload based on the particular UI component.

In some embodiments, the partial offline payload may include a particular UI component that is not represented by the full offline payload. Determining the mapping of the respective UI component may include determining that the particular UI component is not represented by the full offline payload. Updating the corresponding portion of the full offline payload may include, based on determining that the particular UI component is not represented by the full offline payload, generating a new portion of the full offline payload based on the particular UI component.

In some embodiments, the plurality of UI components may include a plurality of different types of UI components. The memory structure may include a plurality of different caches each associated with a corresponding type of the plurality of different types of UI components. Updating the corresponding portion of the full offline payload may include determining a type of the respective UI component. Based on the type of the respective UI component, a corresponding cache may be selected from the plurality of different caches. The corresponding cache containing the corresponding portion of the full offline payload may be updated based on the respective UI component.

In some embodiments, a data structure representing the partial offline payload may indicate, for each respective UI component of the subset of UI components, (i) the type of the respective UI component and (ii) the corresponding identifier of the respective UI component.

In some embodiments, the request for the partial offline payload may indicate a time associated with a prior partial offline payload previously used to update the full offline payload. The server application may be configured to select, based on the time associated with the prior partial offline payload, the partial offline payload for transmission to the software application from a plurality of partial offline payloads generated for the software application at a plurality of different times.

In some embodiments, the request for the partial offline payload may include a payload identifier associated with the full offline payload. The server application may be configured to select, based on the payload identifier, the partial offline payload for transmission to the software application from a plurality of partial offline payloads generated for a plurality of different software applications.

In some embodiments, a request for the full offline payload may be transmitted to the server application before a predetermined time. The full offline payload may be received from the server application. The full offline payload may be stored in the memory structure.

In some embodiments, transmitting the request for the partial offline payload may include establishing a network connection to the server application and, based on establishing the network connection to the server application, transmitting the request for the partial offline payload to an API provided by the server application.

In some embodiments, the software application may be configured to provide for execution of respective operations by displaying a corresponding UI component of the plurality of UI components. An interaction with one or more UI components of the plurality of UI components may be detected. Based on detecting the interaction with the one or more UI components, a request for execution of the respective operations associated with the one or more UI components may be transmitted to the server application. The server application may be configured to (i) update the one or more UI components based on performance of the respective operations associated therewith and (ii) generate a further partial offline payload that includes the one or more UI components as updated. The further partial offline payload may be received from the server application. The one or more UI components as updated by the further partial offline payload may be displayed to indicate completion of execution of respective operations associated with the one or more UI components.

In some embodiments, a visual appearance of the one or more UI components may be modified based on detecting the interaction with the one or more UI components and until receiving the further partial offline payload.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   at least one processor;
   a persistent storage containing a plurality of data used by a plurality of software applications; and
   a server application executed by the at least one processor and configured to perform operations comprising:
      identifying a subset of data from the plurality of data, wherein the subset of data is used to generate a full offline payload for a particular software application from the plurality of software applications, and wherein the full offline payload comprises a plurality of user interface (UI) components selected for the particular software application based on the subset of data;
      monitoring the subset of data to identify a modification to particular data associated with the full offline payload;
      based on identifying the modification to the particular data, generating a partial offline payload based on the particular data as modified, wherein the partial offline payload comprises a subset of UI components of the plurality of UI components, and wherein each UI component of the subset of UI components is updated based on the particular data as modified;
      receiving, from the particular software application, a request for the partial offline payload; and
      based on receiving the request for the partial offline payload, transmitting, to the particular software application, the partial offline payload.

2. The computing system of claim 1, wherein:
   the plurality of data is stored in a database;
   identifying the subset of data comprises identifying (i) one or more database tables from the database that were accessed while generating the full offline payload and (ii) one or more database commands executed to access the subset of data in the one or more database tables; and monitoring the subset of data comprises, after generation of the full offline payload, monitoring the one or more database tables for a modification to one or more data associated with the one or more database commands.

3. The computing system of claim 1, wherein the operations further comprise:

based on generating the partial offline payload, transmitting, to the particular software application, a notification that the partial offline payload is available, wherein reception of the notification is configured to cause the particular software application to transmit, to the server application, the request for the partial offline payload.

4. The computing system of claim 1, wherein the operations further comprise:

based on generating the partial offline payload, storing an indication that the partial offline payload is available, wherein the particular software application is configured to poll the server application for the indication, and wherein reception of the indication is configured to cause the particular software application to transmit, to the server application, the request for the partial offline payload.

5. The computing system of claim 1, wherein the operations further comprise:

monitoring the subset of data to identify a further modification made to the particular data at a first time;
determining a second time at which the partial offline payload was generated;
determining that the first time precedes the second time; and
based on determining that the first time precedes the second time, (i) determining that the partial offline payload includes the further modification made to the particular data and (ii) omitting generation of a further partial offline payload based on the further modification made to the particular data.

6. The computing system of claim 1, wherein the operations further comprise:

generating the full offline payload for the particular software application before a predetermined time and based on one or more attributes associated with the particular software application, wherein the subset of data is identified based on data accessed while generating the full offline payload.

7. The computing system of claim 1, wherein the particular software application is configured to provide for execution of respective operations by displaying a corresponding UI component of the plurality of UI components, and wherein the operations further comprise:

receiving, from the particular software application, a request for execution of the respective operations associated with one or more UI components of the plurality of UI components, wherein the particular software application is configured to transmit the request based on interaction with the one or more UI components;
updating the one or more UI components based on performance of the respective operations associated therewith;
generating a further partial offline payload comprising the one or more UI components as updated; and
transmitting the further partial offline payload to the particular software application.

8. The computing system of claim 1, wherein generating the partial offline payload comprises:

based on identifying the modification to the particular data, determining that the particular software application and at least one other software application each utilize the particular data; and
generating a respective partial offline payload based on the particular data as modified for each of the particular software application and the at least one other software application.

9. The computing system of claim 1, wherein the request for the partial offline payload is received from the particular software application by way of an application programming interface (API) provided by the server application and based on the particular software application establishing a network connection to the computing system.

10. The computing system of claim 1, wherein the operations further comprise:

storing (i) the partial offline payload and (ii) a first time associated with generation of the partial offline payload, wherein the request for the partial offline payload comprises an indication of a second time associated with retrieval of a prior offline payload, and wherein the partial offline payload is transmitted to the particular software application further based on the second time preceding the first time.

11. The computing system of claim 1, wherein the operations further comprise:

monitoring the subset of data to identify a further modification to further data of the subset of data;
based on identifying the further modification to the further data, generating one or more of: (i) an instruction to generate a further partial offline payload based on the further data as modified or (ii) the further partial offline payload;
determining that the further partial offline payload is expired based on one or more of: (i) expiration of the full offline payload or (ii) generation of an additional partial offline payload that supersedes the further partial offline payload; and
based on determining that the further partial offline payload is expired, deleting one or more of: (i) the instruction to generate the further partial offline payload or (ii) the further partial offline payload.

12. The computing system of claim 1, wherein generating the partial offline payload comprises:

determining that the particular software application has retrieved the full offline payload; and
in response to determining that the particular software application has retrieved the full offline payload, generating the partial offline payload.

13. The computing system of claim 1, wherein each respective software application of the plurality of software applications comprises a corresponding instantiation of a mobile software application, and wherein each corresponding instantiation is configured to be executed by a corresponding mobile computing device associated with a corresponding user.

14. The computing system of claim 1, wherein a size of the partial offline payload is not more than a threshold fraction of the full offline payload.

15. A computer-implemented method comprising:

identifying a subset of data from a plurality of data contained in persistent storage and used by a plurality of software applications, wherein the subset of data is used to generate a full offline payload for a particular software application from the plurality of software applications, and wherein the full offline payload comprises a plurality of user interface (UI) components selected for the particular software application based on the subset of data;

monitoring the subset of data to identify a modification to particular data associated with the full offline payload;

based on identifying the modification to the particular data, generating a partial offline payload based on the particular data as modified, wherein the partial offline payload comprises a subset of UI components of the plurality of UI components, and wherein each UI component of the subset of UI components is updated based on the particular data as modified;

receiving, from the particular software application, a request for the partial offline payload; and based on receiving the request for the partial offline payload, transmitting, to the particular software application, the partial offline payload.

16. The computer-implemented method of claim 15, wherein:

the plurality of data is stored in a database;

identifying the subset of data comprises identifying (i) one or more database tables from the database that were accessed while generating the full offline payload and (ii) one or more database commands executed to access the subset of data in the one or more database tables; and monitoring the subset of data comprises, after generation of the full offline payload, monitoring the one or more database tables for a modification to one or more data associated with the one or more database commands.

17. The computer-implemented method of claim 15, further comprising:

based on generating the partial offline payload, transmitting, to the particular software application, a notification that the partial offline payload is available, wherein reception of the notification is configured to cause the particular software application to transmit the request for the partial offline payload.

18. The computer-implemented method of claim 15, further comprising:

based on generating the partial offline payload, storing an indication that the partial offline payload is available, wherein the particular software application is configured to poll a server application for the indication, and wherein reception of the indication is configured to cause the particular software application to transmit the request for the partial offline payload.

19. The computer-implemented method of claim 15, further comprising:

monitoring the subset of data to identify a further modification made to the particular data at a first time;

determining a second time at which the partial offline payload was generated;

determining that the first time precedes the second time; and based on determining that the first time precedes the second time, (i) determining that the partial offline payload includes the further modification made to the particular data and (ii) omitting generation of a further partial offline payload based on the further modification made to the particular data.

20. An article of manufacture including a non-transitory computer-readable medium, having stored thereon program instructions that, upon execution by a computing system, cause the computing system to perform operations comprising:

identifying a subset of data from a plurality of data contained in persistent storage and used by a plurality of software applications, wherein the subset of data is used to generate a full offline payload for a particular software application from the plurality of software applications, and wherein the full offline payload comprises a plurality of user interface (UI) components selected for the particular software application based on the subset of data;

monitoring the subset of data to identify a modification to particular data associated with the full offline payload;

based on identifying the modification to the particular data, generating a partial offline payload based on the particular data as modified, wherein the partial offline payload comprises a subset of UI components of the plurality of UI components, and wherein each UI component of the subset of UI components is updated based on the particular data as modified;

receiving, from the particular software application, a request for the partial offline payload; and based on receiving the request for the partial offline payload, transmitting, to the particular software application, the partial offline payload.

* * * * *